US012689291B2

(12) United States Patent
Zhou et al.

(10) Patent No.: US 12,689,291 B2
(45) Date of Patent: Jul. 21, 2026

(54) MULTI-PHASE POWER CONVERTER WITH EXTERNAL PHASE CIRCUITS

(71) Applicant: Apple Inc., Cupertino, CA (US)

(72) Inventors: Hao Zhou, San Jose, CA (US); Sarfraz Shaikh, Swindon (GB); Jay B. Fletcher, Sunnyvale, CA (US); Sanjay Pant, Santa Clara, CA (US); Mark A. Yoshimoto, San Jose, CA (US); Vincenzo Bisogno, Swindon (GB); Shawn Searles, Austin, TX (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 18/618,171

(22) Filed: Mar. 27, 2024

(65) Prior Publication Data

US 2024/0313646 A1     Sep. 19, 2024

Related U.S. Application Data

(63) Continuation of application No. 18/317,679, filed on May 15, 2023, now abandoned, which is a
(Continued)

(51) Int. Cl.
H02M 3/155     (2006.01)
G06F 1/26     (2006.01)
H02M 1/08     (2006.01)

(52) U.S. Cl.
CPC .............. H02M 3/155 (2013.01); G06F 1/26 (2013.01); H02M 1/08 (2013.01)

(58) Field of Classification Search
CPC ...... H02M 3/155; H02M 1/08; H02M 1/0009; H02M 1/088; H02M 3/1584; G06F 1/26; G05F 1/56
See application file for complete search history.

(56) References Cited

U.S. PATENT DOCUMENTS 7,623,003  B2     11/2009  Kinugasa et al.
10,044,273  B2*     8/2018  Gherghescu  ........  H02M 3/1588
(Continued)

FOREIGN PATENT DOCUMENTS

CN     103683928  A     3/2014
CN     107996018  A     5/2018
(Continued)

OTHER PUBLICATIONS

Office Action in Chinese Appl. No. 202280041140.6 mailed May 21, 2024, 12 pages.
(Continued)

*Primary Examiner* — Kyle J Moody
(74) *Attorney, Agent, or Firm* — Kowert, Hood, Munyon, Rankin & Goetzel, P.C.; Dean M. Munyon

(57)     ABSTRACT

Various embodiments for generating a voltage level on a regulated power supply node are disclosed. In one embodiment, an apparatus includes an external phase circuit on a first integrated circuit, where the external phase circuit is coupled to a regulated power supply node via a first inductor and configured to source a first current to the regulated power supply node using an external demand current and in response to an activation of a first enable signal. The apparatus also includes a control circuit on a second integrated circuit, where the control circuit is configured to generate the external demand current using a voltage of the regulated power supply node and a reference voltage. The control circuit is further configured to generate the first enable signal using a sensed version of the first current.

20 Claims, 17 Drawing Sheets

Related U.S. Application Data continuation of application No. 17/343,459, filed on Jun. 9, 2021, now Pat. No. 11,695,336.

(56) References Cited

U.S. PATENT DOCUMENTS

| | | | | |
|---|---|---|---|---|
| 10,425,009 | B2 | 9/2019 | Couleur et al. | |
| 10,992,232 | B2 * | 4/2021 | Jing | H02M 3/1584 |
| 11,581,809 | B2 * | 2/2023 | Mahapatra | H02M 1/084 |
| 11,695,336 | B2 * | 7/2023 | Zhou | H02M 1/088 |
| | | | | 323/217 |
| 2007/0001658 | A1 * | 1/2007 | Nguyen | H02M 3/1584 |
| | | | | 323/290 |
| 2007/0120543 | A1 | 5/2007 | Caldwell | |
| 2008/0007241 | A1 | 1/2008 | Isham | |
| 2009/0140706 | A1 | 6/2009 | Taufik et al. | |
| 2012/0086416 | A1 | 4/2012 | Kudo et al. | |
| 2012/0262136 | A1 | 10/2012 | Nien et al. | |
| 2016/0268904 | A1 * | 9/2016 | Melendy | H02M 3/1584 |
| 2017/0237349 | A1 | 8/2017 | Labib et al. | |
| 2018/0145594 | A1 | 5/2018 | Akre et al. | |
| 2018/0337599 | A1 | 11/2018 | Chen et al. | |
| 2018/0364784 | A1 | 12/2018 | Luo et al. | |
| 2021/0028683 | A1 | 1/2021 | Jiang et al. | |
| 2021/0167688 | A1 | 6/2021 | Hureau et al. | |

FOREIGN PATENT DOCUMENTS

| | | | |
|---|---|---|---|
| CN | 110445381 | A | 11/2019 |
| EP | 1563608 | B1 | 12/2011 |

OTHER PUBLICATIONS

International Search Report and Written Opinion in PCT Appl. No. PCT/US2022/032186 mailed Sep. 23, 2022, 9 pages.

Office Action in EP Appl. No. 22 820 812.0 mailed Oct. 1, 2025, 9 pages.

Marian K. Kazimierczuk: "Chapter 13: Current-mode Control" In: "Pulse-Width Modulated DC-DC Power Converters", Sep. 16, 2008 (Sep. 16, 2008), John Wiley & Sons, Ltd., U.K., XP055174330, ISBN: 978-0-47-069464-0, pp. 511-570, DOI: 10.1002/9780470694640.ch13.

Extended European Search Report in Appl. No. 22820812.0 mailed Dec. 16, 2024, 11 pages.

* cited by examiner

*Internal/External Phase Circuit 300*

MULTI-PHASE POWER CONVERTER WITH EXTERNAL PHASE CIRCUITS

CROSS-REFERENCE TO RELATED APPLICATIONS

The present application is a continuation of U.S. application Ser. No. 18/317,679, entitled "Multi-Phase Power Converter with External Phase Circuits," filed May 15, 2023, which is a continuation of U.S. application Ser. No. 17/343,459, entitled "Multi-Phase Power Converter with External Phase Circuits," filed Jun. 9, 2021 (now U.S. Pat. No. 11,695,336), the disclosures of which applications are incorporated by reference herein in their entirety.

BACKGROUND

Technical Field

This disclosure relates to power management in computer systems, and, more particularly, to voltage regulator circuit operation.

Description of the Related Art

Modern computer systems may include multiple circuit blocks designed to perform various functions. For example, such circuit blocks may include processors or processor cores configured to execute software or program instructions. Additionally, the circuit blocks may include memory circuits, mixed-signal or analog circuits, and the like.

In some computer systems, the circuit blocks may be designed to operate using different power supply voltage levels. For example, in some computer systems, power management circuits (also referred to as "power management units") may generate and monitor various power supply signals.

Power management circuits often include one or more power converter circuits configured to generate regulator voltage levels on respective power supply signal lines using a voltage level of an input power supply signal. Such converter circuits may employ multiple reactive circuit elements, such as inductors, capacitors, and the like.

SUMMARY OF THE EMBODIMENTS

Various embodiments for generating a voltage level on a regulated power supply node are disclosed. Broadly speaking, a power management unit includes a control circuit and a first phase circuit. The control circuit is configured to generate, using a voltage level of a regulated power supply node, an external demand current and an internal demand current. The first phase circuit is coupled to the regulated power supply node via a first inductor and is configured to source, based on the internal demand current, a first current to the regulated power supply node via the first inductor during a first on-time period. A second phase circuit, external to the power management unit, is coupled to the regulated power supply node via a second inductor, and is configured to source, based on the external demand current, a second current to the regulated power supply node via the second inductor during a second on-time period.

DETAILED DESCRIPTION OF EMBODIMENTS

Figure 1:
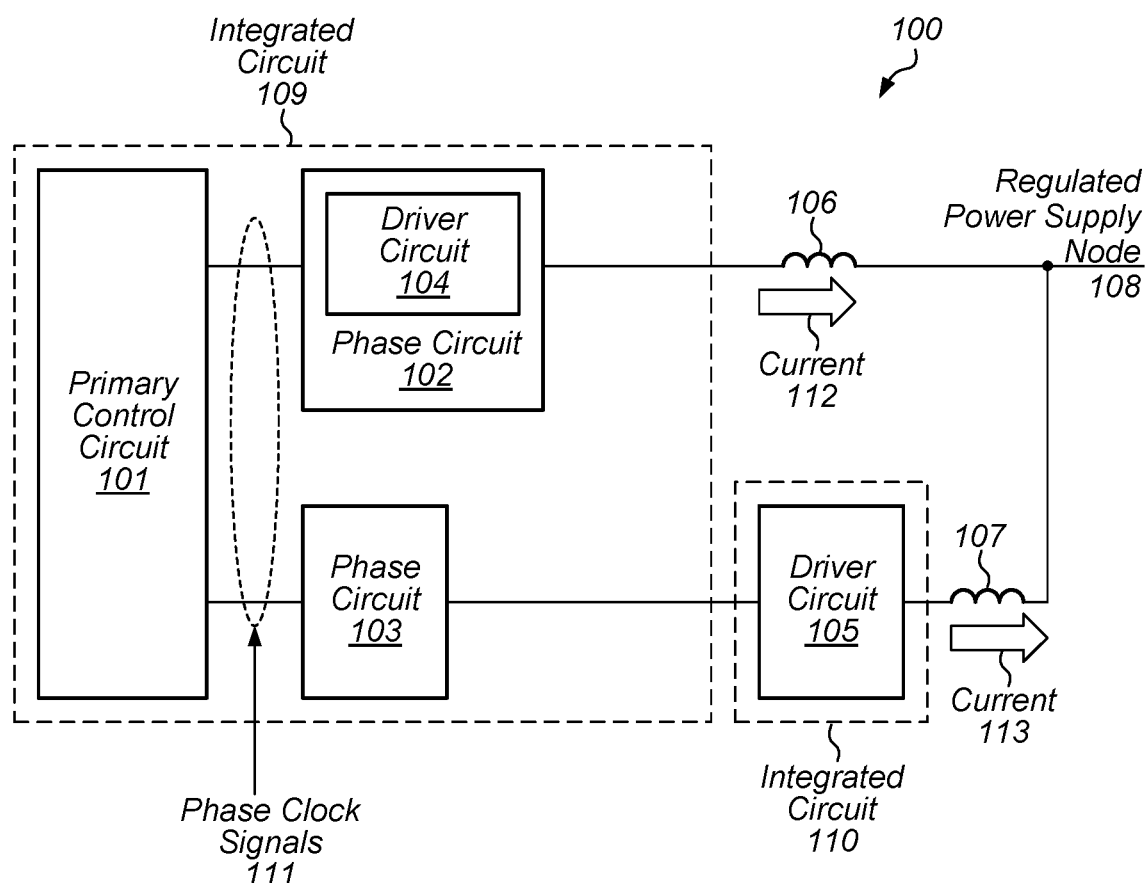
FIG. 1 illustrates a block diagram of an embodiment of a power converter system for a computer system.

Computer systems may include multiple circuit blocks configured to perform specific functions. Such circuit blocks may be fabricated on a common substrate and may employ different power supply voltage levels. Power management units (commonly referred to as "PMUs") may include multiple power converter or voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple switches (also referred to as "power switches") and a switch node that is coupled to a regulated power supply node via an inductor. One switch is coupled between an input power supply node and the switch node, and is referred to as the "high-side switch." Another switch is coupled between the switch node and a ground supply node, and is referred to as the "low-side switch."

When the high-side switch is closed (referred to as "on-time"), energy is applied to the inductor, resulting in the current through the inductor increasing. During this time, the inductor stores energy in the form of a magnetic field. When the high-side switch is opened and the low-side switch is closed (referred to as "off-time"), energy is no longer being applied to the inductor, and the voltage across the inductor reverses, which results in the inductor functioning as a current source, with the energy stored in the inductor's magnetic field supporting the current flowing into the load. The process of closing and opening the high-side and low-side switches is performed periodically to maintain a desired voltage level on the power supply node.

Power converter circuits may employ different regulation modes to determine periodicity and duration of on-times and off-times. As used herein, a regulation mode refers to a particular method of detecting operating conditions to determine frequencies and durations of on-times and off-times employed by a power converter circuit. For example, a power converter may detect a maximum current flowing through its inductor to determine an end of an on-time period. This type of regulation mode is referred to as a "peak-current regulation mode." Alternatively, a power converter may detect a minimum current flowing through its inductor to determine an end of an off-time period. This type of regulation mode is referred to as a "valley-current regulation mode."

As the level of integration increases, power converters need to supply increasing amounts of current to load circuits. For example, in some cases, power converters need to be able to supply 100A or more to load circuits. Existing power converter solutions are limited by thermal budgets and packaging requirements. As a result, the scalability of current power converter designs is limited and inefficient for higher current applications. Moreover, the efficiency of power converter circuits at smaller loads must be maintained, and the design of power converter circuits must be flexible to allow for changes in current requirements at late stages in the design process.

Techniques described in the present disclosure allow for a power converter circuit that employs a combination of external phase and driver circuits that may be located on different integrated circuits. Such external phase and driver circuits may be fabricated with different physical characteristics allowing the use of higher input voltages, thereby allowing the power converter to more easily support higher current demands. With the external phase and driver circuits being located on different integrated circuits, heat generated by the power converter circuit is not located on a single integrated circuit, improving thermal management. Moreover, additional external phase and driver circuits can be added later in the design process to more easily adapt to changes in load current as a computer system design evolves.

Turning to FIG. 1, a block diagram of a power converter system is depicted. As illustrated, power converter system 100 includes primary control circuit 101, phase circuit 102, phase circuit 103, and driver circuit 105. In various embodiments, primary control circuit 101, and phase circuits 102 and 103 are located on integrated circuit 109, while driver circuit 105 is located on integrated circuit 110. It is noted that although only two phase circuits are depicted as being included on integrated circuit 109, in other embodiments, any suitable number of phase circuits may be included on integrated circuit 109.

Primary control circuit 101 is configured to selectively activate either of phase circuits 102 and 103. As described below, primary control circuit 101 may be configured to generate phase clock signals 111, along with other control, reference, and enable signals (all not shown) used by phases circuits 102 and 103. In various embodiments, primary control circuit 101 may be configured to support additional phase circuits. The number of phase circuits managed by primary control circuit 101 may be controlled by control bits that are stored in a register, one-time programmable memory, or other suitable storage location.

As used herein, when a signal is activated, it is set to a logic or voltage level that activates a load circuit or device. The logic level may be either a high logic level or a low logic level depending on the load circuit. For example, an active state of a signal coupled to a p-channel MOSFET is a low logic level (referred to as an "active low signal"), while an active state of a signal coupled to an n-channel MOSFET is a high logic level (referred to as an "active high signal").

Phase circuit 102 includes driver circuit 104 and is configured to activate, using a first phase clock signal of phase clock signals 111, driver circuit 104, which is coupled to regulated power supply node 108 via inductor 106. Driver circuit 104 is configured to source current 112 to regulated power supply node 108 during a first on-time period.

Phase circuit 103 is configured to activate, using a second phase clock signal of phase clock signals 111, driver circuit 105, which is coupled to regulated power supply node 108 via inductor 107. Driver circuit 105 is configured to source current 113 to regulated power supply node 108 during a second on-time period. It is noted that the first on-time period and the second on-time period may be different or they may overlap. The respective timings and durations of the first and second on-time periods may be based on currents 112 and 113, the first and second phase clocks, as well as the voltage level of regulated power supply node 108.

Inductors 106 and 107 may, in various embodiments, be located on integrated circuit 109. Alternatively, inductors 106 and 107 may be located on integrated circuit 110, or an integrated circuit different from either integrated circuit 109 or integrated circuit 110. In various embodiments, inductors 106 and 107 may be implemented as chip inductors coupled to integrated circuits 109 and 110. In other embodiments, inductors 106 and 107 may be fabricated as planar spirals or other suitable structures on either of integrated circuit 109 or 110.

In the embodiment of FIG. 1, driver circuit 105, which is external to integrated circuit 109, is controlled by phase circuit 103. As illustrated, phase circuit 103 has no internal driver circuit and is configured to control only external driver circuits. In some cases, however, phase circuits, such as phase circuit 102, which include internal driver circuits, may be configured to control external driver circuits as well. Another embodiment of a power converter system that includes a phase circuit capable of driving both internal and external driver circuits is depicted in FIG. 2.

As illustrated, power converter system 200 includes primary control circuit 101, phase circuit 102, phase circuit 201, and driver circuit 105. Primary control circuit 101, phase circuit 102, and driver circuit 105 are configured to operate in a similar fashion to what is described in the embodiment of FIG. 1.

Phase circuit 201 includes driver circuit 202 and is configured to activate, using a phase clock signal of phase clock signals 111, driver circuit 105, which is coupled to regulated power supply node 108 via inductor 106. As described below, phase circuit 201 may disable driver circuit 202 based on a value of enable signal 203. In various embodiments, the value of enable signal 203 may be set during initialization or as part of a power-up sequence. Alternatively, the value of enable signal 203 may be stored in a non-volatile memory circuit, a one-time programmable memory circuit, or any other suitable storage circuit.

Figure 2:
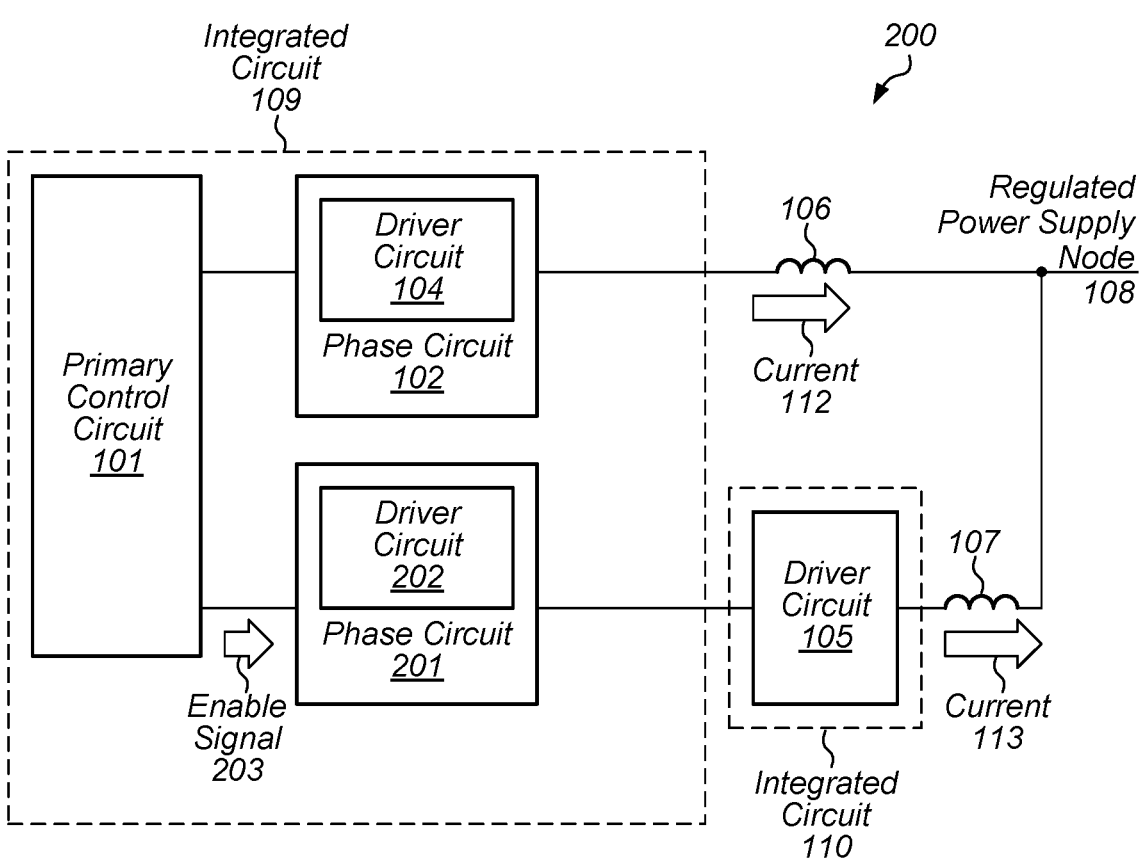
FIG. 2 illustrates a block diagram of another embodiment of a power converter system.

It is noted the embodiment depicted in FIG. 2 is merely an example. In other embodiments, additional phase circuits, including phase circuits without internal driver circuits, may be included on integrated circuit 109.

As described above, different types of phase circuits may be employed in a power converter circuit. Some phase circuits may be dedicated for use with external driver circuits (referred to as "external phase circuits"), while other phase circuits may be used with both internal and external driver circuits (referred to as "internal/external phase circuits").

Figure 3:
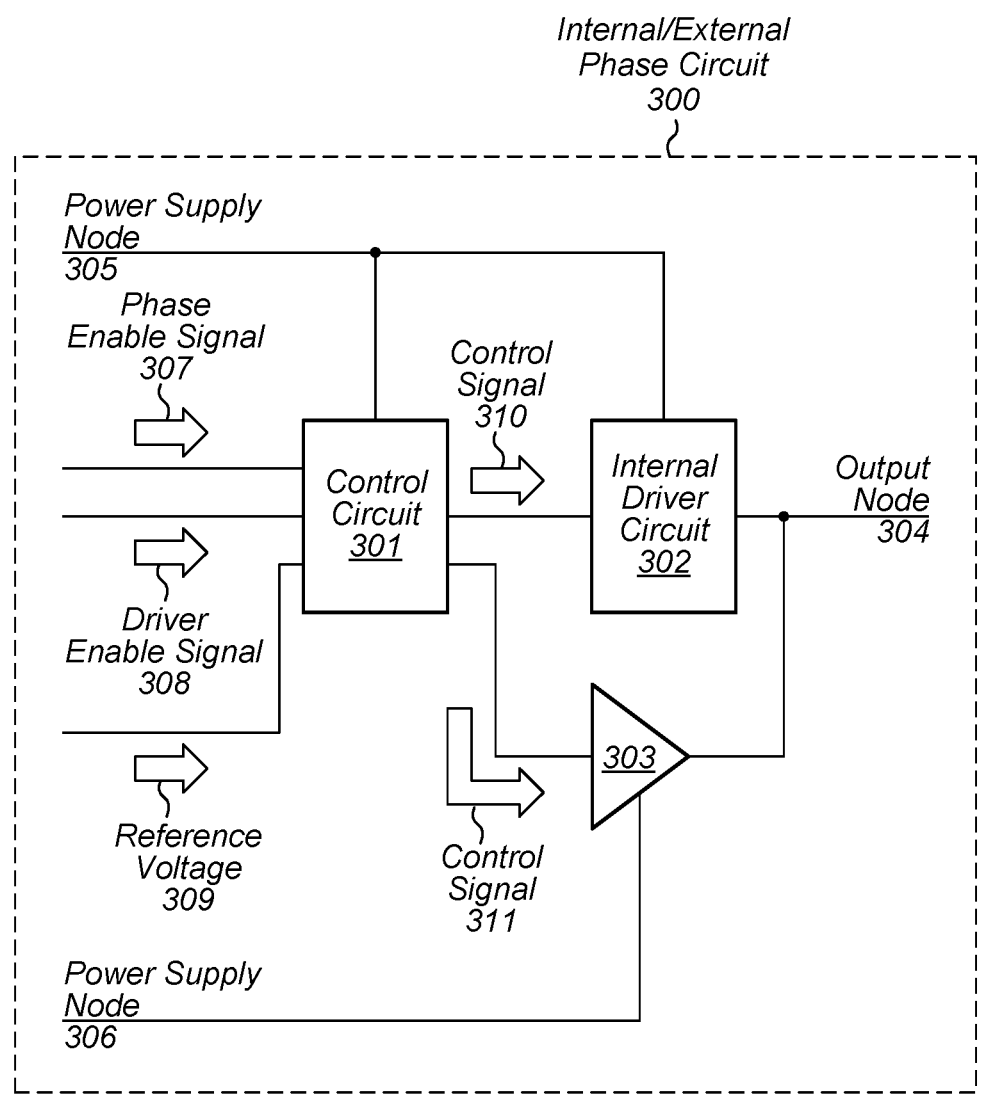
FIG. 3 illustrates a block diagram of an embodiment of an internal/external phase circuit for a power converter circuit.

A block diagram of an embodiment of an internal/external phase circuit is depicted in FIG. 3. As illustrated, internal/external phase circuit 300 includes control circuit 301, internal driver circuit 302, and buffer circuit 303. In various embodiments, internal/external phase circuit 300 may correspond to phase circuit 102 as depicted in FIG. 1.

Control circuit 301 is configured to generate control signal 310 and control signal 311 using phase enable signal 307, driver enable signal 308, and reference voltage 309. In some embodiments, phase enable signal 307 may be a phase clock signal whose frequency is used in determining a duration of an on-time or off-time associated with a driver circuit. Reference voltage 309 may, in various embodiments, be indicative of a desired voltage level for regulated power supply node 108.

In various embodiments, control circuit 301 may be configured to generate control signal 310 for a particular value of driver enable signal 308, and to generate control signal 311 for a different value of driver enable signal 308. For example, in response to a determination that driver enable signal 308 is at a high logic level, control circuit 301 may activate control signal 311 based on the values of phase enable signal 307 and reference voltage 309.

As described below, control circuit 301 may be configured to generate control signal 310 to determine the on-time and off-time of high-side and low-side switches in a driver circuit (e.g., internal driver circuit 302). Control circuit 301 may be configured to control the on-time and off-time according to pulse-width modulation or pulse-frequency modulation. In various embodiments, control circuit 301 may employ either peak-current regulation or valley-current regulation.

Control circuit 301 may be implemented using any suitable combination of combinatorial and sequential logic circuits. In various embodiments, control circuit 301 may include one or more comparator or amplifier circuits.

Internal driver circuit 302 is configured to drive output node 304 based on control signal 310. In various embodiments, output node 304 may be coupled to an inductor (e.g., inductor 106), when driver enable signal 308 is set to a value to cause internal/external phase circuit 300 to operate using internal driver circuit 302 as opposed to an external driver circuit. As described below, internal driver circuit 302 may include multiple high-side switches that can couple output node 304 to power supply node 305, allowing a current to flow from power supply node 305 through output node 304 into an inductor. Internal driver circuit 302 may also include multiple low-side switches that can couple output node 304 to a ground supply node, allowing the inductor to function as a current source as its magnetic field collapses. The number of high-side switches and low-side switches can vary based on operating mode. For example, when internal/external phase circuit 300 is operating as an internal phase circuit, internal driver circuit 302 may employ all available high-side and low-side switches, and when internal/external phase circuit 300 is operating as an external phase circuit, internal driver circuit 302 may all, or any suitable portion thereof, of the available high-side and low-side switches.

Buffer circuit 303 is coupled to power supply node 306, and is configured to buffer control signal 311 and drive the signal onto output node 304. It is noted that, in various embodiments, a voltage level of power supply node 306 is greater than a voltage level of power supply node 305. In various embodiments, when buffer circuit 303 is inactive, it may enter a high output impedance state (referred to as "tri-state") to avoid loading the output of internal driver circuit 302. Buffer circuit 303 may, in some embodiments, be implemented as a non-inverting amplifier circuit, two inverter logic gates coupled in series, or any other suitable circuit.

Figure 4:
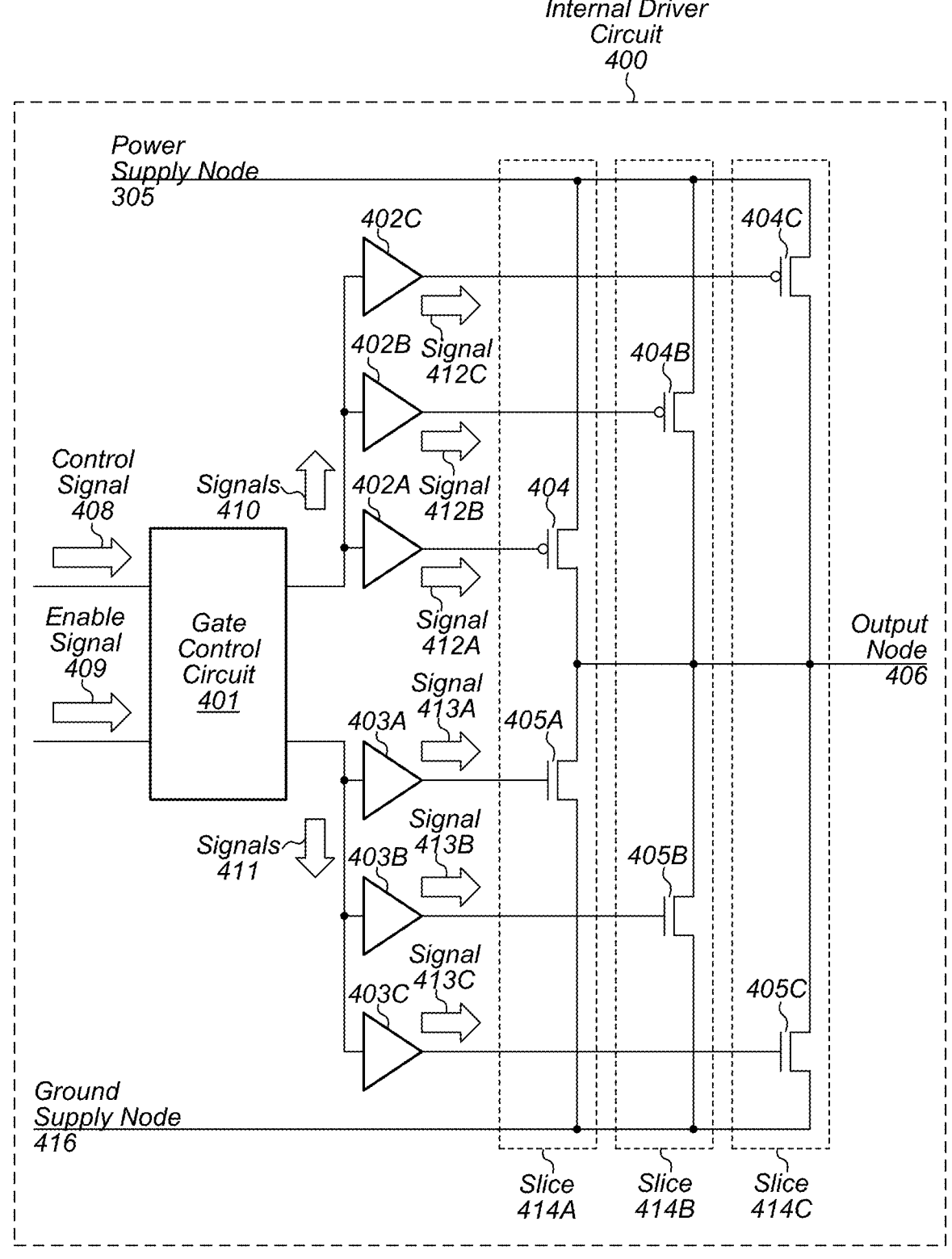
FIG. 4 illustrates a block diagram of an embodiment of an internal driver circuit.

Turning to FIG. 4, a block diagram of an internal driver circuit is depicted. As illustrated, internal driver circuit 400 includes gate control circuit 401, buffer circuits 402A-C, buffer circuits 403A-C, and slices 414A-C. Slice 414A includes devices 404A and 405A, and slice 414B includes devices 404B and 405B. In a similar fashion, slice 414C includes devices 404C and 405C. In various embodiments, internal driver circuit 400 may correspond to internal driver circuit 302 as depicted in FIG. 3.

Gate control circuit 401 is configured to generate signals 410 and 411 using control signal 408 and enable signal 409. In various embodiments, enable signal 409 may correspond to driver enable signal 308, and control signal 408 may correspond to phase enable signal 307 as depicted in FIG. 3. It is noted that in various embodiments, different ones of signals 410 and 411 may be activated to activate different ones of slices 414A-C. By adjusting the number of slices 414A-C that are active, the strength with which output node 406 is driven can be adjusted, allowing internal driver circuit 400 to driver either an inductor or an external driver circuit. In some embodiments, gate control circuit 401 is configured to deactivate signals 410 and 411 in response to a determination that enable signal 409 is deactivated.

When enable signal 409 is active, gate control circuit 401 is configured to activate signals 410 and 411 based on control signal 408. For example, gate control circuit 401 may be configured to activate particular ones of signals 410 and deactivate particular ones of signals 411 in response to a determination that control signal 408 is active. In some cases, gate control circuit 401 may be configured to activate one or more of signals 410 and deactivate one or more of signals 411 during an on-time of phase circuit (e.g., internal/external phase circuit 300). Gate control circuit 401 may be further configured to deactivate one or more of signals 410 and activate one or more of signals 411 during an off-time of the phase circuit.

To avoid shoot-through current from power supply node 305 to ground supply node 306 416 when devices 404A-C and 405A-C are both active, gate control circuit 401 may, in some embodiments, be configured to generate signals 410 and 411 such that particular ones of signals 410 and 411 are not active at the same time. In various embodiments, gate control circuit 401 may be implemented using any suitable combination of combinatorial and sequential logic circuits.

Buffer circuit 402A is configured to generate signal 412A using one of signals 410, and buffer circuit 402B is configured to generate signal 412B using a different one of signals 410. In a similar fashion, buffer circuit 402C is configured to generate signal 412C using a corresponding one of signals 410. Buffer circuit 403A is configured to generate signal 413A using one of signals 411, and buffer circuit 403B is configured to generate signal 413B using a different one of signals 411. In a similar fashion, buffer circuit 403C is configured to generate signal 413C using a corresponding one of signals 411. In some embodiments, buffer circuits 402A-C and 403A-C may provide additional drive, in order to drive the control terminals of devices 404A-C and 405A-

C, respectively. Buffer circuits 402A-C and 403A-C may, in various embodiments, be implemented as non-inverting amplifier circuits, series connected inverter gates, or any other suitable circuit.

Devices 404A-C are coupled between power supply node 305 and output node 406, and are controlled by corresponding ones of signals 412A-C. For example, in response to a determination that signal 412A is active, device 404A is configured to couple power supply node 305 to output node 406, allowing current to flow from power supply node 305 into output node 406. It is noted that output node 406 may be coupled to an inductor (e.g., inductor 106), in which case devices 404A-C may collectively function as a high-side switch for the inductor. Alternatively, output node 406 may be coupled to an external driver circuit, such as driver circuit 105. In various embodiments, devices 404A-C may be implemented as p-channel metal-oxide semiconductor field-effect transistors (MOSFETs), Fin field-effect transistors (FinFETs), or a gate-all-around field-effect transistors (GAAFETs).

Devices 405A-C are coupled between output node 406 and ground supply node 416, and are configured to couple output node 406 to ground supply node 416 based on corresponding ones of signals 413A-C. When output node 406 is coupled to an inductor, devices 405A-C collectively function as a low-side switch for the inductor, allowing the inductor to be de-magnetized during an off period. In various embodiments, devices 405A-C may be implemented as n-channel MOSFETs, FinFETs, or GAAFETs.

Figure 5:
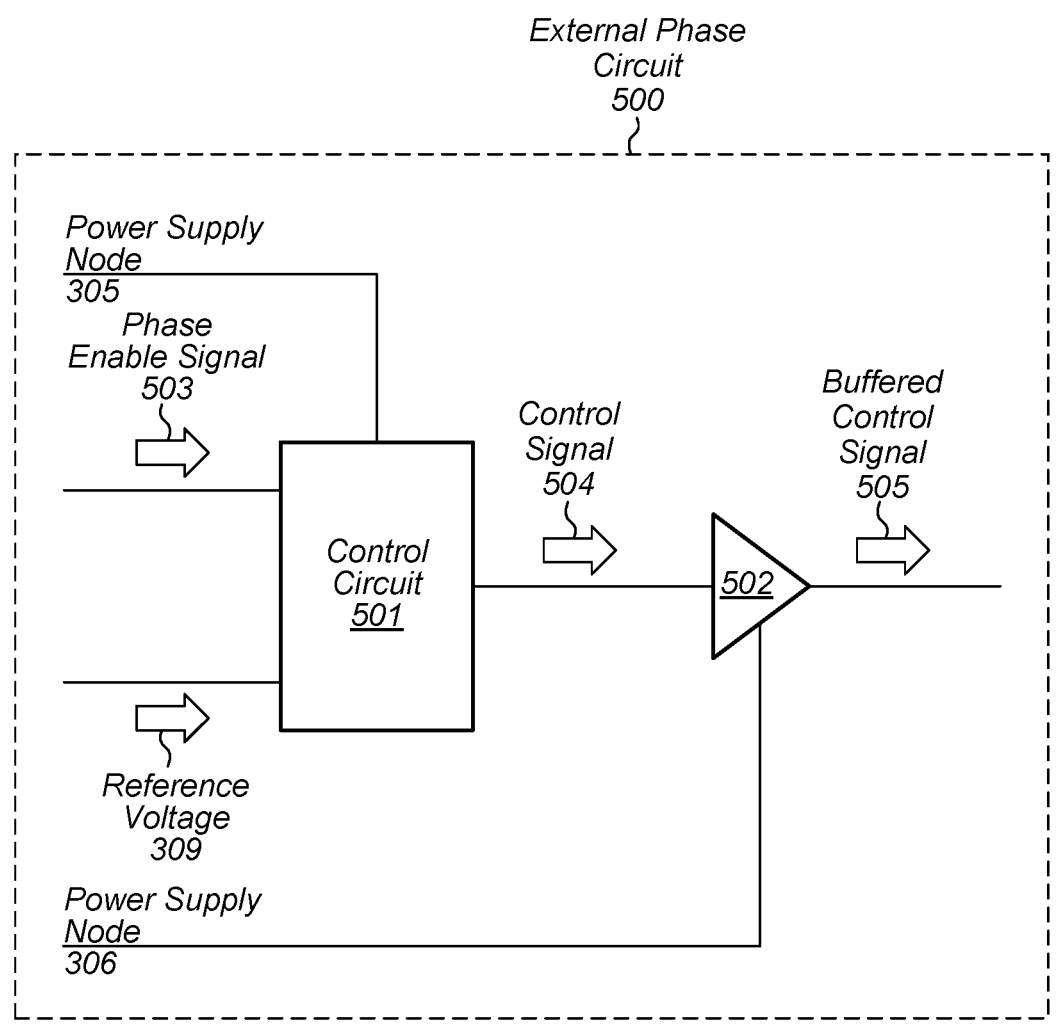
FIG. 5 illustrates a block diagram of an embodiment of an external phase circuit for a power converter circuit.

As described above, some phase circuits do not include an internal driver circuit and are configured to drive an external driver circuit. A block diagram of an embodiment of such a phase circuit is depicted in FIG. 5. As illustrated, external phase circuit 500 includes control circuit 501 and buffer circuit 502. In various embodiments, external phase circuit 500 may correspond to phase circuit 103 as depicted in FIG. 1.

Control circuit 501 is configured to generate control signal 504 using phase enable signal 503, and reference voltage 309. In some embodiments, phase enable signal 503 may be a phase clock signal whose frequency is used in determining a duration of an on-time or off-time associated with a driver circuit. Reference voltage 309 may, in various embodiments, be indicative of a desired voltage level for regulated power supply node 108.

As described below, control circuit 501 may be configured to generate control signal 504 to determine the on-time and off-time of high-side and low-side switches in a driver circuit (e.g., driver circuit 105). Control circuit 501 may be configured to control the on-time and off-time according to pulse-width modulation or pulse-frequency modulation. In various embodiments, control circuit 501 may employ either peak-current regulation or valley-current regulation.

Control circuit 501 may be implemented using any suitable combination of combinatorial and sequential logic circuits. In various embodiments, control circuit 501 may include one or more comparator or amplifier circuits.

Buffer circuit 502 is coupled to power supply node 306, and is configured to buffer control signal 504 to generate buffered control signal 505. It is noted that, in various embodiments, a voltage level of power supply node 306 is greater than a voltage level of power supply node 305. Buffer circuit 502 may, in some embodiments, be implemented as a non-inverting amplifier circuit, two inverter logic gates coupled in series, or any other suitable circuit.

Figure 6:
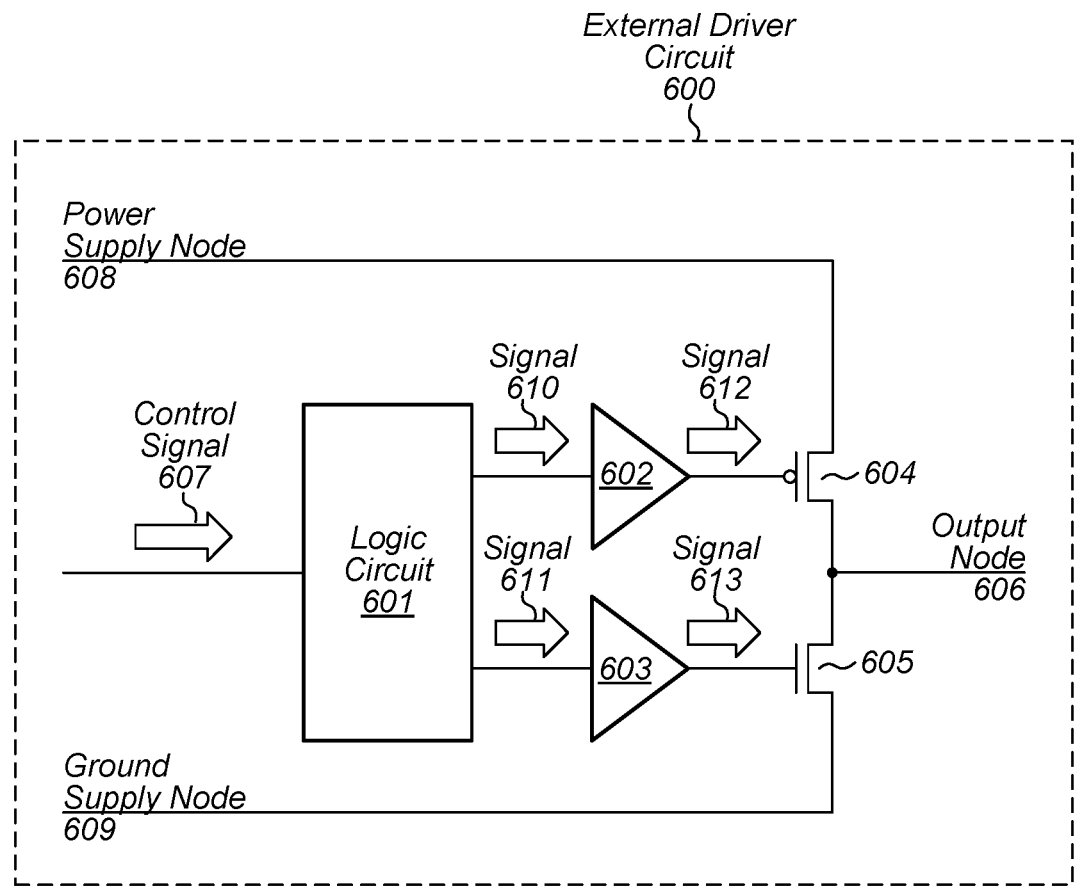
FIG. 6 illustrates a block diagram of an embodiment of an external driver circuit for a power converter circuit.

Turning to FIG. 6, a block diagram of an external driver circuit is depicted. As illustrated, external driver circuit 600 includes logic circuit 601, buffer circuit 602, buffer circuit 603, and devices 604 and 605. In various embodiments, external driver circuit 600 may correspond to driver circuit 105 as depicted in FIG. 1.

Logic circuit 601 is configured to generate signals 610 and 611 using control signal 607. In various embodiments, control signal 607 may correspond to one of phase clock signals 111 as depicted in FIG. 1. Logic circuit 601 is configured to activate signals 610 and 611 based on control signal 607. For example, logic circuit 601 may be configured to activate signal 610 and deactivate signal 611 in response to a determination that control signal 607 is active. In some cases, logic circuit 601 may be configured to activate signal 610 and deactivate signal 611 during an on-time of phase circuit (e.g., phase circuit 103). Logic circuit 601 may be further configured to deactivate signal 610 and activate signal 611 during an off-time of the phase circuit.

To avoid shoot-through current from power supply node 608 to ground supply node 609 when devices 604 and 605 are both active, logic circuit 601 may, in some embodiments, be configured to generate signals 610 and 611 such that both signals are not active at the same time. In various embodiments, logic circuit 601 may be implemented using any suitable combination of combinatorial and sequential logic circuits.

Buffer circuit 602 is configured to generate signal 612 using signal 610, and buffer circuit 603 is configured to generate signal 613 using signal 611. In some embodiments, buffer circuits 602 and 603 may provide additional drive in order to drive the control terminals of devices 604 and 605, respectively. Buffer circuits 602 and 603 may, in various embodiments, be implemented as non-inverting amplifier circuits, series connected inverter gates, or any other suitable circuit.

Device 604 is coupled between power supply node 608 and output node 606, and is controlled by signal 612. In response to a determination that signal 612 is active, device 604 is configured to couple power supply node 608 to output node 606, allowing current to flow from power supply node 608 into output node 606. It is noted that output node 606 may be coupled to an inductor (e.g., inductor 107), in which case device 604 may function as a high-side switch for the inductor. In various embodiments, device 604 may be implemented as a p-channel MOSFET, FinFET, or a GAAFET.

Device 605 is coupled between output node 606 and ground supply node 609, and is configured to couple output node 606 to ground supply node 609 based on signal 613. When output node 606 is coupled an inductor, device 605 functions as a low-side switch for the inductor, allowing the inductor to be de-magnetized during an off period. In various embodiments, device 605 may be implemented as an n-channel MOSFET, FinFET, or GAAFET. It is noted that devices 604 and 605 may have different physical characteristics (e.g., oxide thickness) than devices 404 and 405, allowing devices 604 and 605 to operate with higher voltages than devices 404 and 405.

Figure 7:
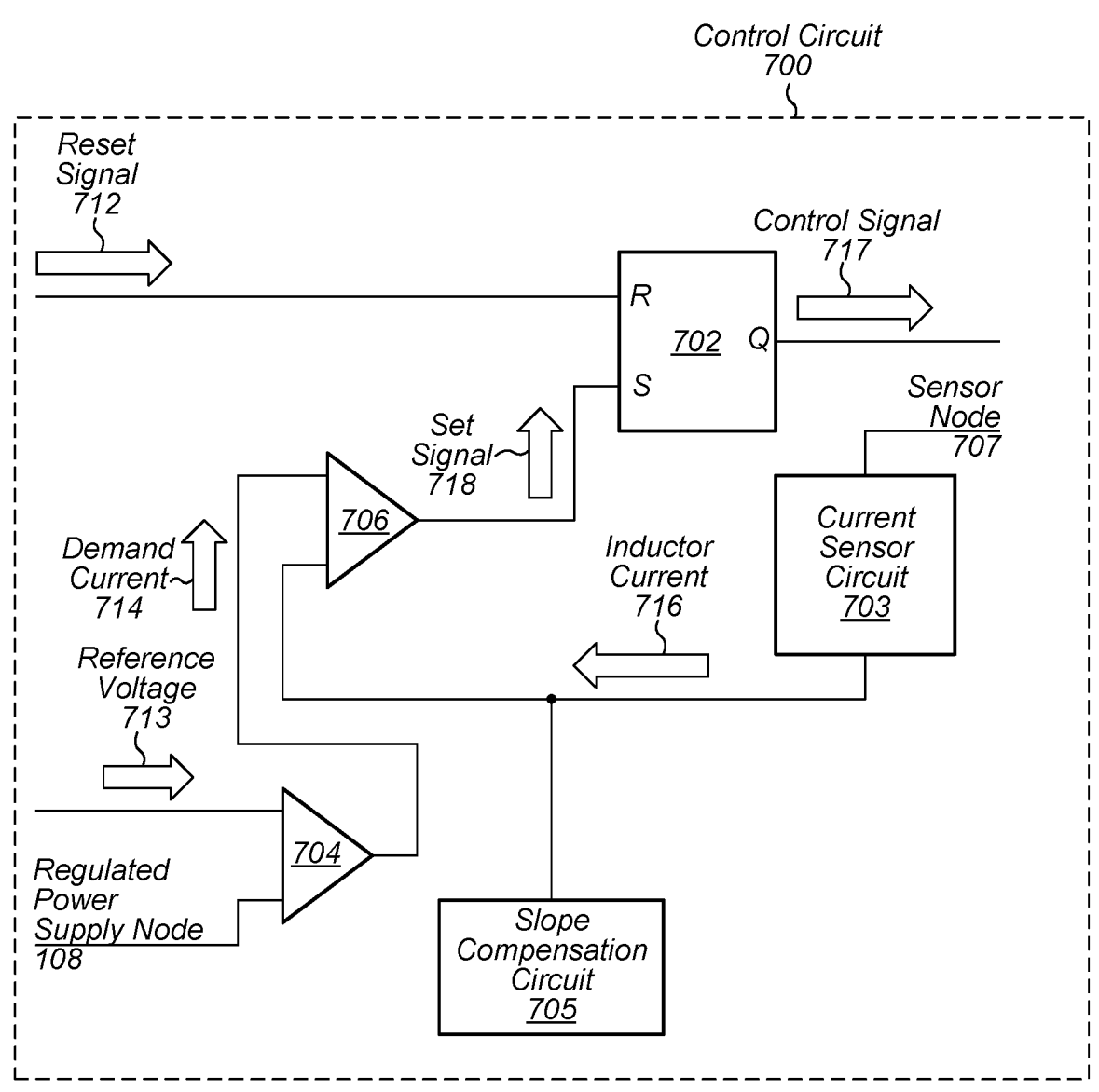
FIG. 7 illustrates a block diagram of a control circuit for a power converter phase circuit.

Turning to FIG. 7, a block diagram of an embodiment of a control circuit is depicted. As illustrated, control circuit 700 includes latch circuit 702, current sensor circuit 703, error amplifier circuit 704, slope compensation circuit 705, and comparator circuit 706. In various embodiments, control circuit 700 may correspond to control circuit 301 or control circuit 501.

Latch circuit 702 is configured to deactivate control signal 717 using reset signal 712 and set signal 718. In various embodiments, reset signal 712 may correspond to one of phase clock signals 111. In some embodiments, latch circuit 702 is configured to activate control signal 717 in response to an activation of set signal 718, and deactivate control signal 717 in response to an activation of reset signal 712. In various embodiments, latch circuit 702 may be implemented as a set-reset (SR) latch circuit that includes any suitable combination of logic gates.

Current sensor circuit 703 is coupled to sensor node 707, and is configured to generate inductor current 716. Sensor node 707 may, in some embodiments be coupled to a switch node of a power converter circuit, or coupled to a terminal of a device in a driver circuit (e.g., driver circuit 105). In various embodiments, current sensor circuit 703 may measure a voltage drop across the device in the driver circuit and generate inductor current 716 using the measured voltage drop. Current sensor circuit 703 may include any suitable combination of reference and amplifier circuits.

Error amplifier circuit 704 is configured to generate demand current 714 using reference voltage 713 and a voltage level of regulated power supply node 108. In various embodiments, error amplifier circuit 704 may be configured to generate demand current 714 such that a value of demand current 714 is proportional to a difference between reference voltage 713 and the voltage level of regulated power supply node 108. Error amplifier circuit 704 may, in some embodiments, be implemented as a differential amplifier circuit, or any other suitable comparator circuit.

Slope compensation circuit 705 is configured to modify inductor current 716. In various embodiments, slope compensation circuit 705 may be configured, in a process referred to as "slope compensation," to combine a periodic current ramp with inductor current 716. It is noted that slope compensation is used to improve the stability of a phase circuit (e.g., phase circuit 102) by increasing a frequency at which the regulator feedback loop can operate, thereby reducing a time for the phase circuit to recover from transients.

Comparator circuit 706 is configured to generate set signal 718 using demand current 714 and inductor current 716. Comparator circuit 706 may, in some embodiments, be configured to compare demand current 714 to inductor current 716, and, in response to a determination that demand current 714 is less than inductor current 716, activate set signal 718. In various embodiments, comparator circuit 706 may be implemented using a differential amplifier circuit, a Schmitt trigger circuit, or any other suitable comparator circuit.

Figure 8:
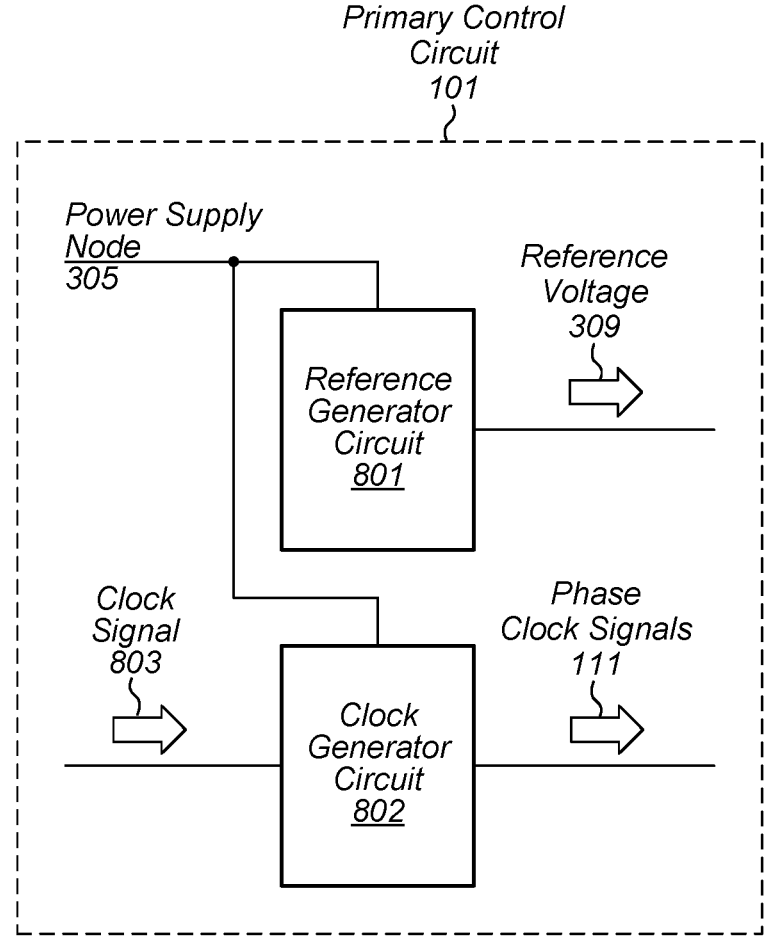
FIG. 8 illustrates a block diagram of a primary control circuit for a power converter circuit.

Turning to FIG. 8, a block diagram of an embodiment of primary control circuit 101 is depicted. As illustrated, primary control circuit 101 includes reference generator circuit 801 and clock generator circuit 802.

Reference generator circuit 801 is coupled to power supply node 305 and is configured to generate reference voltage 309. In various embodiments, reference generator circuit 801 may be implemented as a bandgap reference circuit, or any other suitable supply and temperature independent reference circuit. In some cases, reference generator circuit 801 may include a startup circuit configured to drive reference generator circuit 801 into a known state during a power-up operation.

Clock generator circuit 802 is configured to generate phase clock signals 111 using clock signal 803. In various embodiments, clock generator circuit 802 may be configured to generate phase clock signals 111 such that individual ones of phase clock signals 111 are out of phase with each other. In some cases, respective frequencies of phase clock signals 111 may be the same as a frequency of clock signal 803, while, in other cases, the respective frequencies of phase clock signals 111 may be greater than or less than the frequency of clock signal 803.

Clock generator circuit 802 may be implemented using any suitable combination of combinatorial and sequential logic circuits. In some cases, clock generator circuit 802 may include phase-locked loop or delay-locked loop circuits. Although clock generator circuit 802 is depicted as generating a single set of phase clock signals, in other embodiments, clock generator circuit 802 may generator multiple groups of phase clock signals for controlling different sets of phase circuits coupled to respective regulated power supply nodes.

As described above, some power converter circuits employ external driver circuits to allow for better thermal management while supplying higher load currents. In other cases, a combination of internal and external phase circuits may be employed with similar benefits. By employing both internal and external phases, a power converter may have an improved load transient response. Internal phase circuits can operate with a higher switching frequency, thereby allowing them to respond faster to a change in load before an external phase circuit can respond. Using both internal and external phase circuits can reduce undershoot and overshoot on the regulated power supply node. A block diagram of an embodiment of a power management system that employs both internal and external phase circuits is depicted. As illustrated, power management system 900 includes external phase circuit 903, inductors 904 and 905, and power management unit 911, which includes control circuit 901 and internal phase circuit 902.

Control circuit 901 is configured to generate external demand current 910, internal demand current 908 and enable signal 909 using a voltage level of regulated power supply node 108. In some embodiments, control circuit 901 may be further configured to generate a plurality of enable signals including enable signal 909.

Internal phase circuit 902 is coupled to regulated power supply node 108 via inductor 904, and is configured to source, based on the internal demand current 908, current 906 to regulated power supply node 108 via inductor 904 during a first on-time period. In some embodiments, internal phase circuit 902 may be further to source current 906 in response to a determination that a corresponding one of the plurality of enable signals is active.

External phase circuit 903 coupled to regulated power supply node 108 via inductor 905, and is configured to source, based on external demand current 910 and enable signal 909, current 907 to regulated power supply node 108 via inductor 905 during a second on-time period. In some embodiments, external phase circuit 903 is further configured to source current 907 in response to a determination that enable signal 909 is active.

Figure 9:
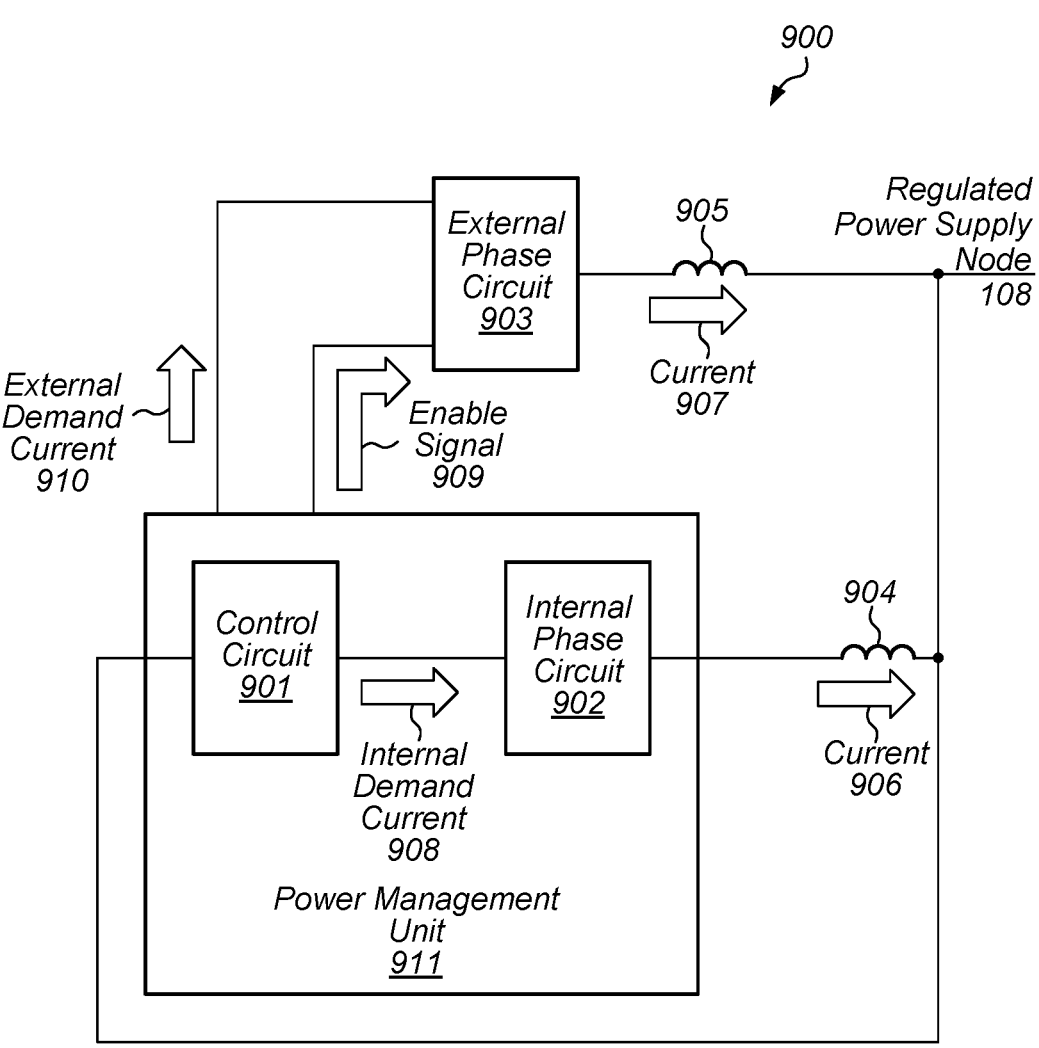
FIG. 9 illustrates a block diagram of a power management system that employs external phase circuits.

Although only a single internal phase circuit and a single external phase circuit are depicted in the embodiment of FIG. 9, in other embodiments, any suitable number of internal and external phase circuits may be employed. In some embodiments, respective numbers of internal phase circuits and external phase circuit included in power management system 900 may be based on a desired maximum load current that can be drawn from regulated power supply node 108.

Figure 10:
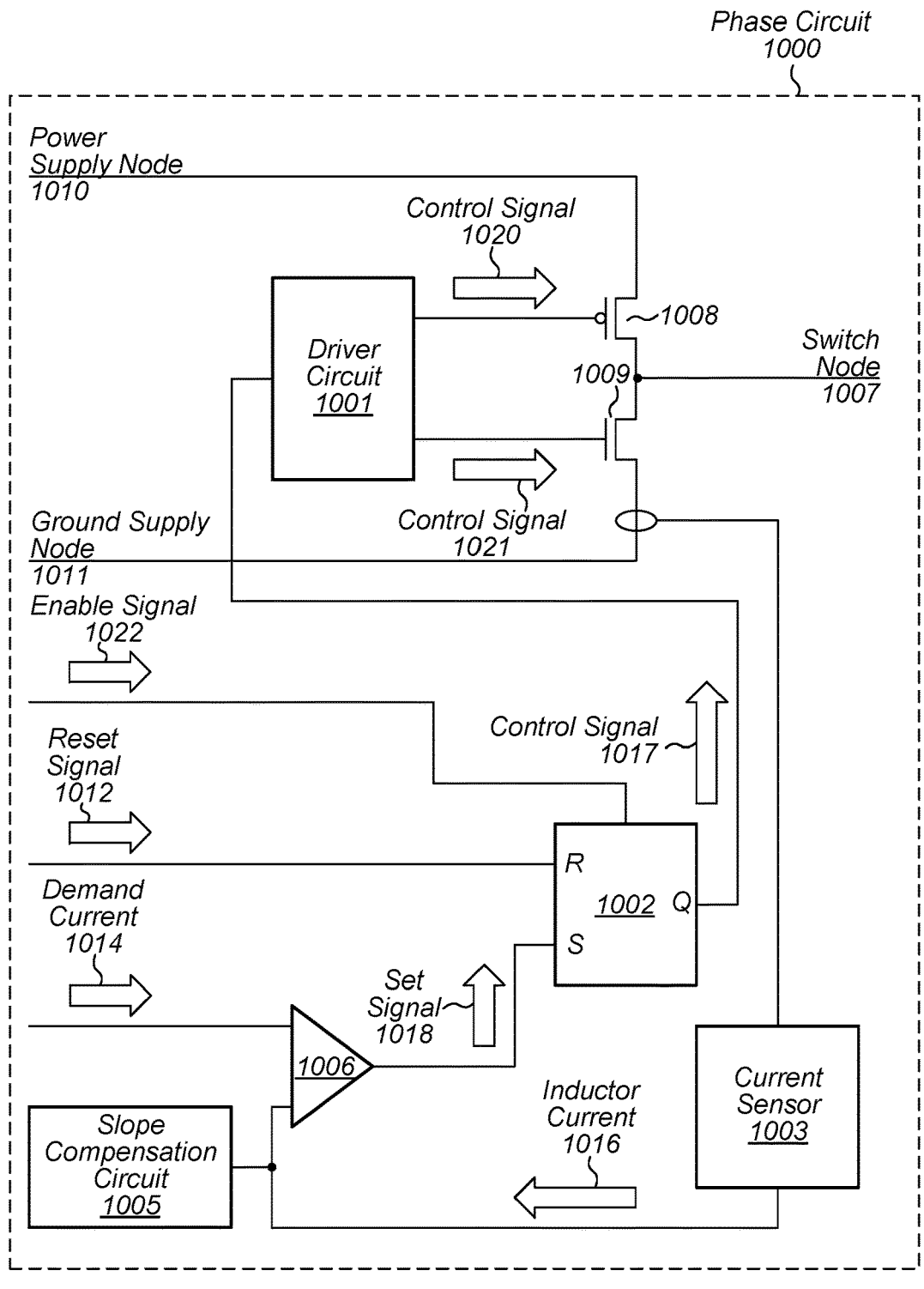
FIG. 10 illustrates a block diagram of a phase circuit for use with a power management circuit.

Turning to FIG. 10, a block diagram of an embodiment of a phase circuit is depicted. As illustrated, phase circuit 1000 includes driver circuit 1001, device 1008, device 1009, latch circuit 1002, comparator circuit 1006, slope compensation circuit 1005, and current sensor circuit 1003.

Device 1008 is coupled between input power supply node 1010 and switch node 1007, and is controlled by control signal 1020. In a similar fashion, device 1009 is coupled between switch node 1007 and ground supply node 1011, and is controlled by control signal 1021. In various embodiments, switch node 1007 may be further coupled to an inductor, which is, in turn, coupled to a regulated power supply node.

In response to an activation of control signal 1020, device 1008 is configured to couple input power supply node 1010 to switch node 1007, allowing current to flow through into an inductor, magnetizing the inductor. In response to an activation of control signal 1021, device 1009 is configured to couple switch node 1007 to ground supply node 1011. With switch node 1007 coupled to ground supply node 1011, energy is no longer being supplied to the inductor, causing the magnetic field of the inductor to collapse. As the magnetic field collapses, the inductor functions as a current source, providing current to the regulated power supply node.

In various embodiments, device 1008 may be implemented as a p-channel MOSFET, a FinFET, a GAAFET, or any other suitable transconductance device. Device 1009 may, in some embodiments, be implemented as an n-channel MOSFET, FinFET, GAAFET, or other suitable transconductance device.

Driver circuit 1001 is configured to generate control signal 1020 and control signal 1021 using control signal 1017. In various embodiments, driver circuit 1001 may be configured, in response to an activation of control signal 1017, to activate control signal 1020 and deactivate control signal 1021. Driver circuit 1001 may be further configured, in response to a deactivation of control signal 1017, to deactivate control signal 1020 and activate control signal 1021. In some embodiments, driver circuit 1001 may include any suitable combination of logic gates, sequential logic circuit elements, MOSFETs, FinFETs, GAAFETs, or any other suitable transconductance devices.

Latch circuit 1002 is configured to deactivate control signal 1017 using reset signal 1012, set signal 1018, and enable signals 1022. In some embodiments, latch circuit 1002 is configured to activate control signal 1017 in response to an activation of set signal 1018 while enable signal 1022 is active, and deactivate control signal 1017 in response to an activation of reset signal 1012 while enable signal 1022 is active. Latch circuit 1002 is configured to deactivate control signal 1017 is response to a determination that enable signal 1022 is inactive. In various embodiments, latch circuit 1002 may be implemented as a set-reset (SR) latch circuit that includes any suitable combination of logic gates.

Current sensor circuit 1003 is configured to generate inductor current 1016. In various embodiments, current sensor circuit 1003 may measure a voltage drop across device 1009 and generate inductor current 1016 using the measured voltage drop. Current sensor circuit 1003 may include any suitable combination of reference and amplifier circuits.

Slope compensation circuit 1005 is configured to modify inductor current 1016. In various embodiments, slope compensation circuit 1005 may be configured, in a process referred to as "slope compensation," to combine a periodic current ramp with inductor current 1016. It is noted that slope compensation is used to improve the stability of phase circuit 1000 by increasing a frequency at which the regulator feedback loop can operate, thereby reducing a time for phase circuit 1000 to recover from transients.

Comparator circuit 1006 is configured to generate set signal 1018 using demand current 1014 and inductor current 1016. Comparator circuit 1006 may, in some embodiments, be configured to compare demand current 1014 to inductor current 1016, and, in response to a determination that demand current 1014 is less than inductor current 1016, activate set signal 1018. In various embodiments, comparator circuit 1006 may be implemented using a differential amplifier circuit, a Schmitt trigger circuit, or any other suitable comparator circuit.

Figure 11:
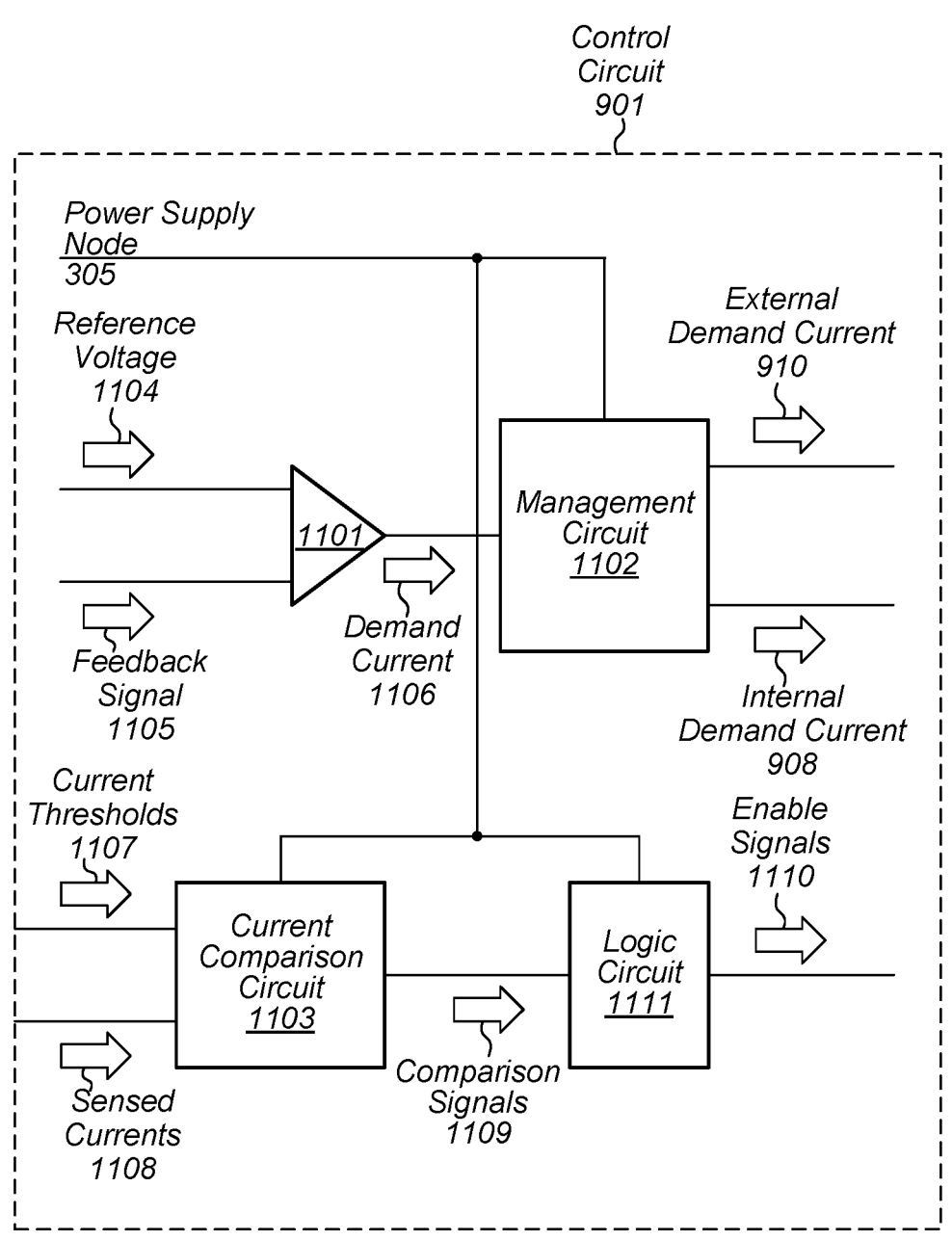
FIG. 11 illustrates a block diagram of a control circuit for use with a power management circuit.

Turning to FIG. 11, a block diagram of an embodiment of control circuit 901 is depicted. As illustrated, control circuit 901 includes error amplifier 1101, management circuit 1102, current comparison circuit 1103, and logic circuit 1111.

Error amplifier 1101 is configured to generate demand current 1106 using reference voltage 1104 and feedback signal 1105. In various embodiments, a value of feedback signal 1105 may be based on a voltage level of regulated power supply node 108. Error amplifier 1101 may, in various embodiments, be configured generate demand current 1106 such that a value of demand current 1106 is proportional to a difference between reference voltage 1104 and feedback signal 1105. In some embodiments, error amplifier 1101 may be implemented using a differential amplifier circuit, or any other suitable comparator circuit.

Management circuit 1102 is configured to generate external demand current 910 and internal demand current 908 using demand current 1106. Although a single external demand current and a single internal demand current are depicted in the embodiment of FIG. 11, in other embodiments, management circuit 1102 may be configured to generate any suitable number of internal and external demand currents. In some embodiments, management circuit 1102 may be configured to scale demand current 1106 in order to generate external demand current 910 and internal demand current 908. Management circuit 1102 may, in various embodiments, include any suitable combination of current mirror circuits, amplifier circuits, and bias circuits.

Current comparison circuit 1103 is configured to generate comparison signals 1109 using sensed currents 1108 and current thresholds 1107. It is noted that sensed currents 1108 may correspond to inductor currents for inductors coupled to internal phase circuits such as internal phase circuit 902. In various embodiments, current comparison circuit 1103 may be configured to compare a given one of sense currents 1108 to a corresponding one of current thresholds 1107 to generate a particular one of comparison signals 1109.

Current comparison circuit 1103 may, in various embodiments, be implemented using multiple differential amplifier circuits, or other comparator circuits, with resistors coupled to their respective inputs in order to convert current thresholds 1107 and sensed currents 1108 to voltages for comparison. In some embodiments, additional circuits, e.g., Schmitt trigger circuits, may be used to convert the output of the differential amplifier circuits to digital values for comparison signals 1109.

Logic circuit 1111 is configured to generate enable signals 1110 using comparison signals 1109. In various embodiments, logic circuit 1111 may be configured to activate a given one of enable signals in response to a determination that a number of comparison signals 1109 has exceed a threshold value. For example, if two enable signals are active, and the comparison signals for the two phase circuits are active, then the current limit for the two phase circuits has been reaches, and logic circuit 1111 may activate a third enable signal to activate a third phase circuit. By generating enable signals 1110 in such a fashion, increases or decreases, in the load current drawn from regulated power supply node 108 result in a corresponding increase or decrease in the number of active phase circuits. Adjusting the number of active phase circuits can ensure that there are an adequate number of phase circuits active to supply the needed current and prevent undesirable drops in the voltage level of regulated power supply node 108.

Logic circuit 1111 may, in various embodiments, be implemented using any suitable combination of combinatorial logic and sequential logic circuits. In some cases, logic circuit 1111 may be implemented as a microcontroller or general-purpose processor circuit configured to execute software or program instructions.

Figure 12:
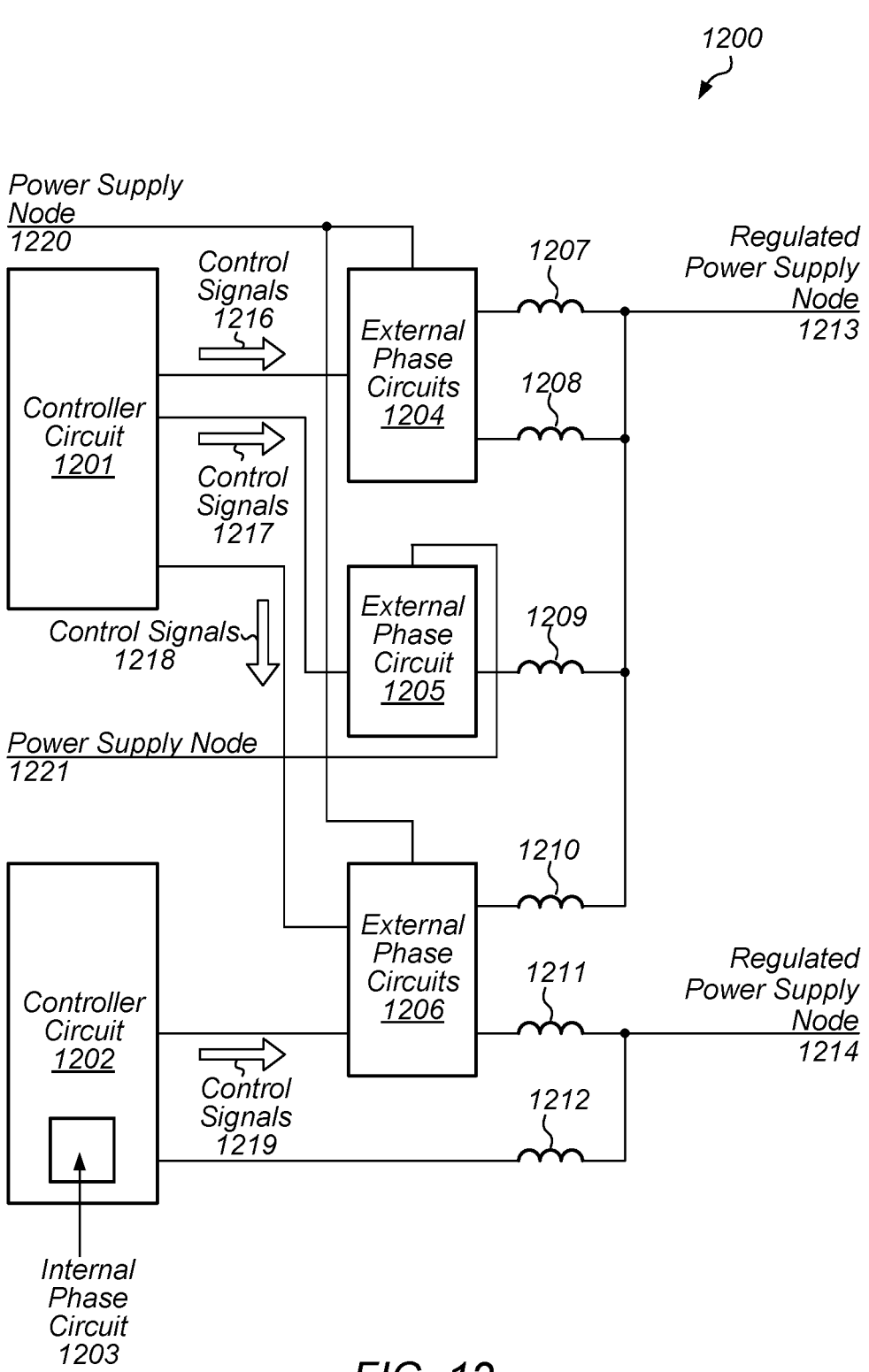
FIG. 12 illustrates a block diagram of a power management system with shared phase circuits.

In some computer systems, different groups of functional circuits may require different power supply voltage levels. To accommodate such functional circuit blocks, a power management system may be configured to generate voltage levels on multiple regulated power supply nodes. A block diagram of an embodiment of a power management system that is configured to generate voltage levels of multiple regulated power supply nodes is depicted in FIG. 12. As illustrated, power management system 1200 includes controller circuits 1201 and 1202, and external phase circuits 1204-1206.

Controller circuit 1201 is configured to manage the voltage level of regulated power supply node 1213, by generating control signals 1216-1218. Control signals 1216 are used to control a particular phase within external phase circuits 1204, while control signals 1217 are used to control external phase circuit 1205. Control signals 1218 are used to control a given phase circuit within external phase circuits 1206. As described below, external phase circuit 1206 is shared between controller circuit 1201 and controller circuit 1202.

Controller circuit 1202 includes internal phase circuit 1203 and is configured to manage the voltage level of regulated power supply node 1214. Controller circuit 1202 is configured to control the operation of internal phase circuit 1203, which is configured to source current to regulated power supply node via inductor 1212. Additionally, controller circuit 1202 is further configured to generate control signals 1219, which are used to control a particular phase of external phase circuits 1206. In various embodiments, control signals 1219 may include a demand current that is used by the particular phase of external phase circuits 1206 to determine an on-time for supply current through inductor 1211 to regulated power supply node 1214.

External phase circuit 1204 include multiple phase circuit (e.g., phase circuit 1000 as depicted in FIG. 10), and is coupled to power supply node 1220 and inductors 1207 and 1208, both of which are further coupled to regulated power supply node 1213. In various embodiments, external phase circuit 1204 is configured to source respective currents through inductors 1207 and 1208. External phase circuit 1204 may, in some embodiments, be configured to determine an on-time for the currents through inductors 1207 and 1208 using control signals 1216. In other embodiments, external phase circuit 1204 may be configured to determine when to start the on-time for the currents based on a demand current included in control signals 1216.

External phase circuit 1205 includes a single phase circuit (e.g., phase circuit 1000 as depicted in FIG. 10), and is coupled to power supply node 1221. In various embodiments, a voltage level of power supply node 1221 may be greater than a voltage level of power supply node 1220.

External phase circuit 1205 is further coupled to inductor 1209, which is, in turn, coupled to regulated power supply node 1213. In some embodiments, external phase circuit 1205 is configured to source a current to regulated power supply node 1213 via inductor 1209. By using a power supply node with a high voltage level allows external phase circuit 1205 to, in some embodiments, source additional current to regulated power supply node 1213 during periods of high load.

External phase circuit 1206 includes multiple phases, and is coupled to power supply node 1220 and inductors 1210 and 1211. Inductor 1210 is further coupled to regulated power supply node 1213, while inductor 1211 is coupled to regulated power supply node 1214. By using different ones of the multiple phases for different power supply node 1214. External phase circuit 1206 is shared between controller circuit 1201 and controller circuit 1202, each controlling one phase within external phase circuit 1206 to source current to regulated power supply nodes 1213 and 1214. Such sharing allows for providing current supply capacity to different regulated power supply nodes, while minimizing the impact on area.

It is noted that in some embodiments, controller circuits 1201 and 1202 may be included on a first integrated circuit, and external phase circuits 1204-1206 may be located on a second integrated circuit. Inductors 1207-1212 may be located on either the first integrated circuit, the second integrated circuit, a third integrated circuit, or elsewhere within a computer system that includes the first and second integrated circuits. Although only three controller circuits and three external phase circuits are depicted in the embodiment of FIG. 12, in other embodiments, any suitable number of controller circuits, external phase circuits, and power supply nodes for the external phase circuits may be employed.

Figure 13:
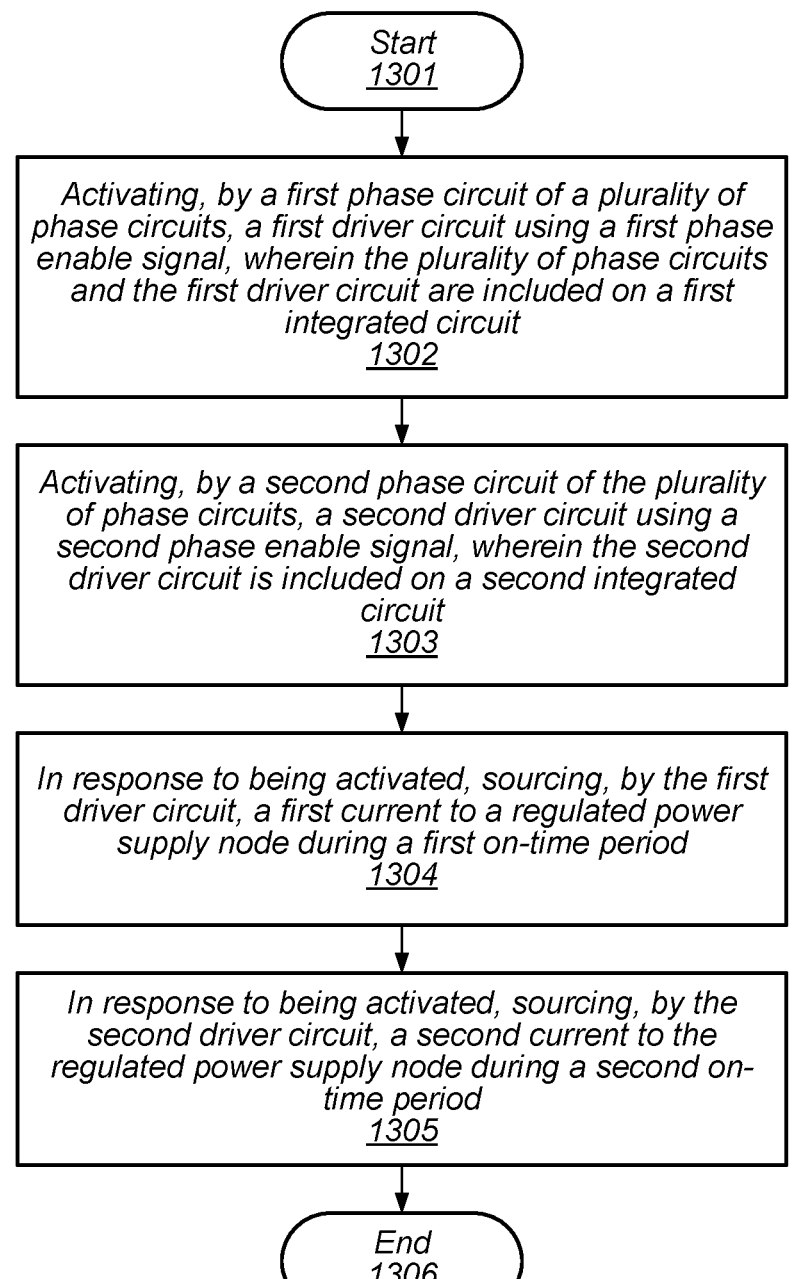
FIG. 13 illustrates a flow diagram that depicts an embodiment of a method for operating a power converter system.

Turning to FIG. 13, a flow diagram depicting an embodiment of a method for operating a power converter system is illustrated. The method, which may be applied to power converter system 100, begins in block 1301.

The method includes activating, by a first phase circuit of a plurality of phase circuits, a first driver circuit using a first phase enable signal, wherein the plurality of phase circuits and the first driver circuit are included on a first integrated circuit (block 1302). The method further includes activating, by a second phase circuit of the plurality of phase circuits, a second driver circuit using a second phase enable signal, wherein the second driver circuit is included on a second integrated circuit (block 1303).

In some embodiments, the second phase circuit may be further coupled to a third driver circuit that is included on the first integrated circuit. In such cases, the method may further include deactivating, by the second phase circuit, the third driver circuit based on a driver enable signal.

The method may, in various embodiments, also include generating, by a primary control circuit, the first and second phase enable signals, where the primary control circuit is included on the first integrated circuit. In other embodiments, the method may include generating, by the primary control circuit, the driver enable signal based on a load current being drawn from the regulated power supply node, and generating, by the primary control circuit, a reference voltage level using a voltage level of the first power supply node.

In various embodiments, the first driver circuit is coupled to a first power supply node and the second driver circuit is coupled to a second power supply node. In some embodiments, the plurality of phase circuits is coupled to the first power supply node. A voltage level of the second power supply node may, in various embodiments, be greater than a voltage level of the first power supply node.

The method also includes, in response to being activated, sourcing, by the first driver circuit, a first current to the regulated power supply node during a first on-time period (block 1304). In various embodiments, sourcing the first current to the regulated power supply node may include comparing the reference voltage to a voltage level of the regulated power supply node.

The method further includes, in response to being activated, sourcing, by the second driver circuit, a second current to the regulated power supply node during a second on-time period (block 1305). In various embodiments, a duration of the second on-time period may be based on a value of the second current or on a clock signal. The method concludes in block 1306.

Figure 14:
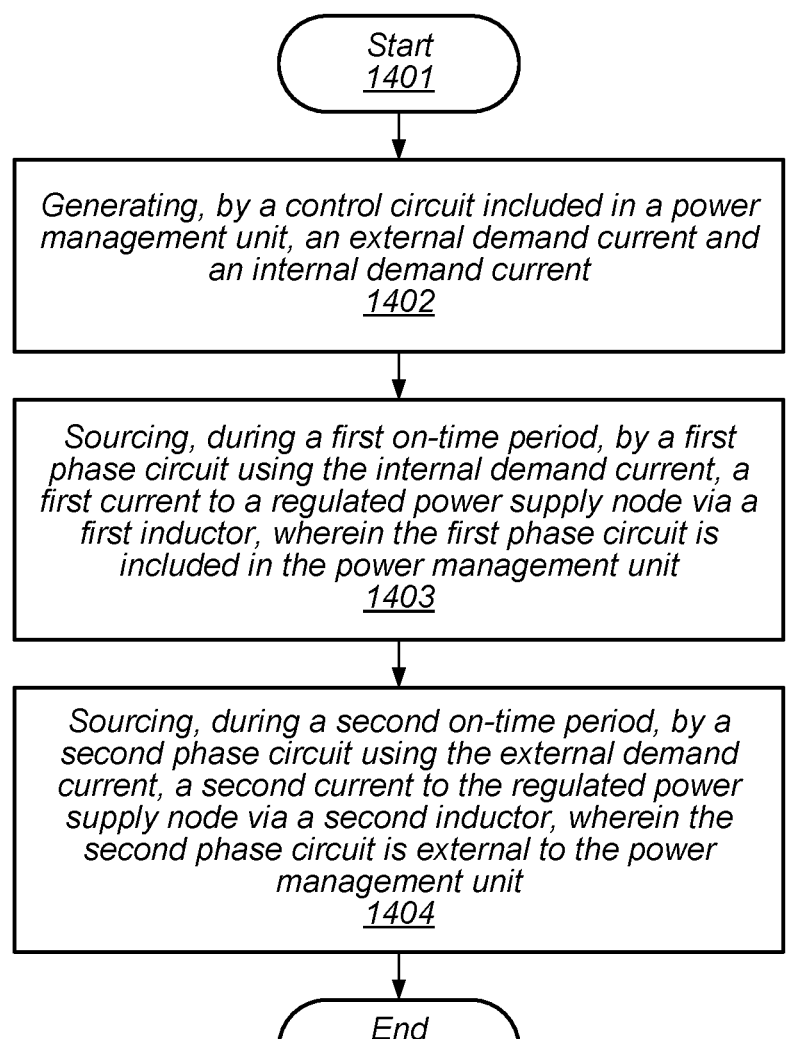
FIG. 14 illustrates a flow diagram that depicts an embodiment of a method for operating a power management circuit.

Turning to FIG. 14, a flow diagram depicting an embodiment of a method of operating a power management system with external phase circuit is illustrated. The method, which may be applied to power management system 900, begin in block 1401.

The method includes generating, by a control circuit in a power management unit, an external demand current and an internal demand current (block 1402). In various embodiments, generating, by the control circuit, the external demand current and the internal demand current includes comparing a feedback signal to a threshold value, where a value of the feedback signal is based on a voltage level of the regulated power supply node.

The method also includes sourcing, during a first on-time period, by a first phase circuit using the internal demand current, a first current to a regulated power supply node via a first inductor, where the first phase circuit is included in the power management unit (block 1403). In some embodiments, sourcing the first current includes determining a current flowing in the first inductor, and comparing the internal demand current to the current flowing in the first inductor.

The method further includes sourcing, during a second on-time period, by a second phase circuit using the external demand current, a second current to the regulated power supply node via a second inductor, where the second phase circuit is external to the power management unit (block 1404). In some embodiments, sourcing the second current includes determining a current flowing in the second inductor, and comparing the external demand current to the current flowing in the second inductor.

It is noted that, in some cases, the power management unit may be located on a first integrated circuit, and the second phase circuit may be located on a second integrated circuit. In some embodiments, the first and second inductors may be located on a third integrated circuit, or attached to a interposer or other substrate to which the first and second integrated circuits are also attached.

In various embodiments, the method may also include generating, by the control circuit, a plurality of enable signals. The method may further include sourcing, by the first phase circuit, the first current in response to determining a first enable signal of the plurality of enable signals is active, and sourcing, by the second phase circuit, the second current in response to determining a second enable signal of the plurality of enable signals is active. In some embodiments, a number of active enable signals is based on a value of a load current being drawn from the regulated power supply node. The method concludes in block 1405.

Figure 15:
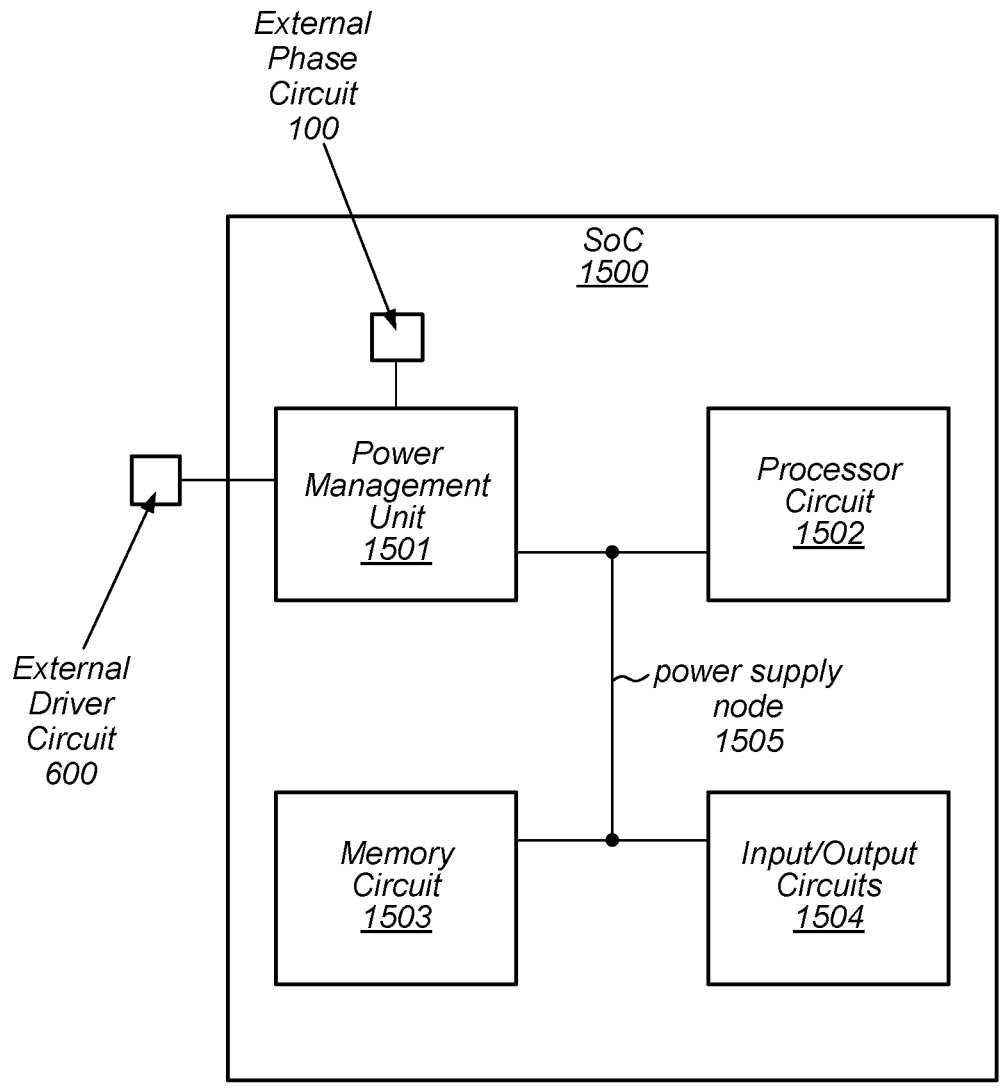
FIG. 15 is a block diagram of a system-on-a-chip.

A block diagram of a system-on-a-chip (SoC) is illustrated in FIG. 15. In the illustrated embodiment, SoC 1500 includes power management unit 1501, processor circuit 1502, memory circuit 1503, and input/output circuits 1504, each of which is coupled to power supply node 1505. In various embodiments, SoC 1500 may be configured for use in a desktop computer, server, or in a mobile computing application such as, e.g., a tablet, laptop computer, or wearable computing device.

Power management unit 1501 is configured to generate a regulated voltage level on power supply node 1505 in order to provide power to processor circuit 1502, memory circuit 1503, and input/output circuits 1504. In various embodiments, power management unit 1501 may employ external driver circuit 600 as depicted in FIG. 6, and external phase circuit 903 as depicted in FIG. 9. Although power management unit 1501 is depicted as generating a voltage level for a single power supply node, in other embodiments, power management unit 1501 may be configured to generate multiple voltage levels on respective power supply nodes.

Processor circuit 1502 may, in various embodiments, be representative of a general-purpose processor that performs computational operations. For example, processor circuit 1502 may be a central processing unit (CPU) such as a microprocessor, a microcontroller, an application-specific integrated circuit (ASIC), or a field-programmable gate array (FPGA).

Memory circuit 1503 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 15, in other embodiments, any suitable number of memory circuits may be employed.

Input/output circuits 1504 may be configured to coordinate data transfer between SoC 1500 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1504 may be configured to implement a version of Universal Serial Bus (USB) protocol or IEEE 1394 (Firewire®) protocol.

Input/output circuits 1504 may also be configured to coordinate data transfer between SoC 1500 and one or more devices (e.g., other computing systems or integrated circuits) coupled to SoC 1500 via a network. In one embodiment, input/output circuits 1504 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1504 may be configured to implement multiple discrete network interface ports.

Figure 16:
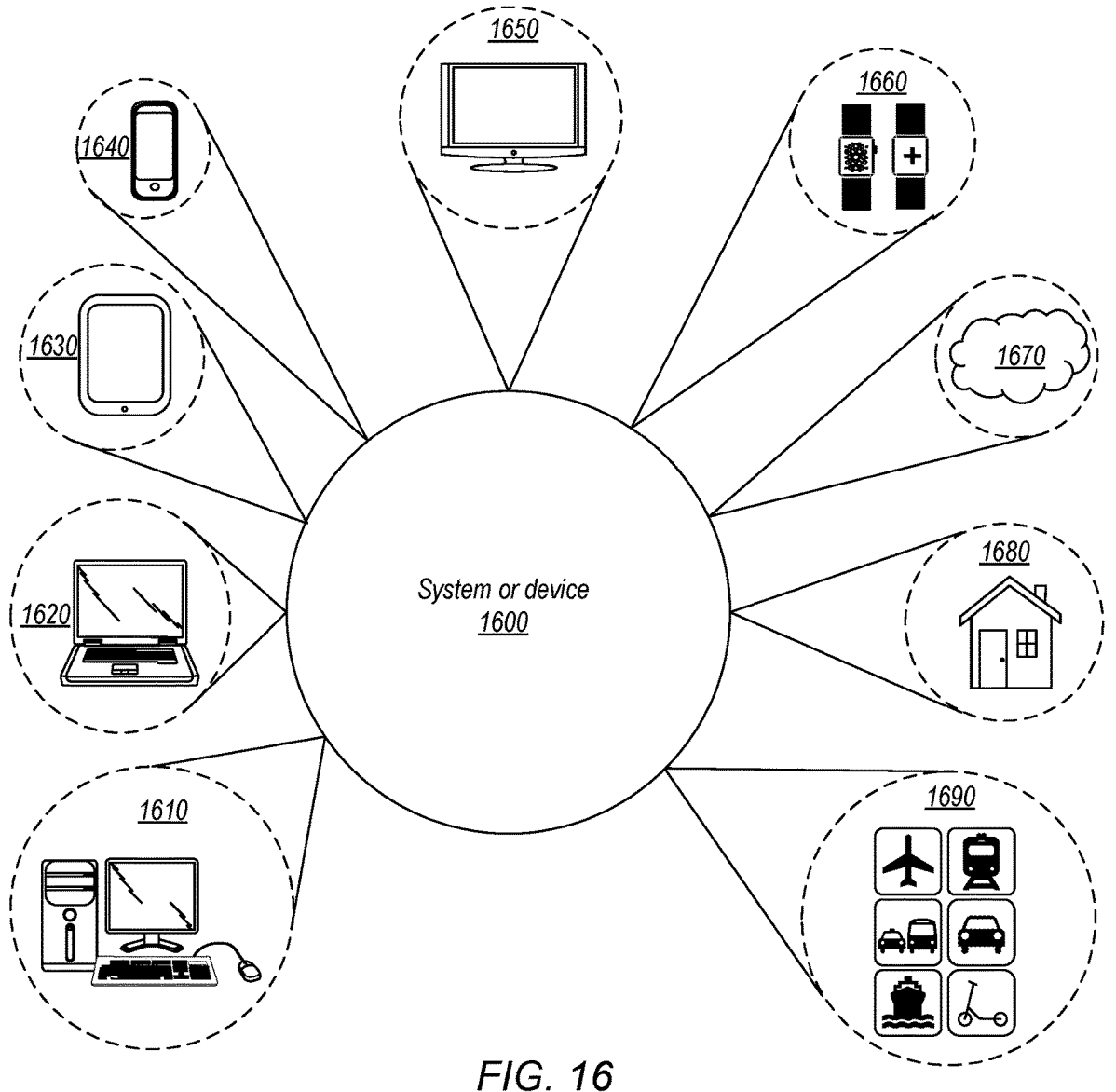
FIG. 16 is a block diagram of an embodiment of a computer system.

Turning now to FIG. 16, various types of systems that may include any of the circuits, devices, or systems discussed above are illustrated. System or device 1600, which may incorporate or otherwise utilize one or more of the techniques described herein, may be utilized in a wide range of areas. For example, system or device 1600 may be utilized as part of the hardware of systems such as a desktop computer 1610, laptop computer 1620, tablet computer 1630, cellular or mobile phone 1640, or television 1650 (or set-top box coupled to a television).

Similarly, disclosed elements may be utilized in a wearable device 1660, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1600 may also be used in various other contexts. For example, system or device 1600 may be utilized in the context of a server computer system, such as a dedicated server or on shared hardware that implements a cloud-based service 1670. Still further, system or device 1600 may be implemented in a wide range of specialized everyday devices, including devices 1680 commonly found in the home such as refrigerators, thermostats, security cameras, etc. The interconnection of such devices is often referred to as the "Internet of Things" (IoT). Elements may also be implemented in various modes of transportation. For example, system or device 1600 could be employed in the control systems, guidance systems, entertainment systems, etc. of various types of vehicles 1690.

The applications illustrated in FIG. 16 are merely exemplary and are not intended to limit the potential future applications of disclosed systems or devices. Other example applications include, without limitation: portable gaming devices, music players, data storage devices, unmanned aerial vehicles, etc.

Figure 17:
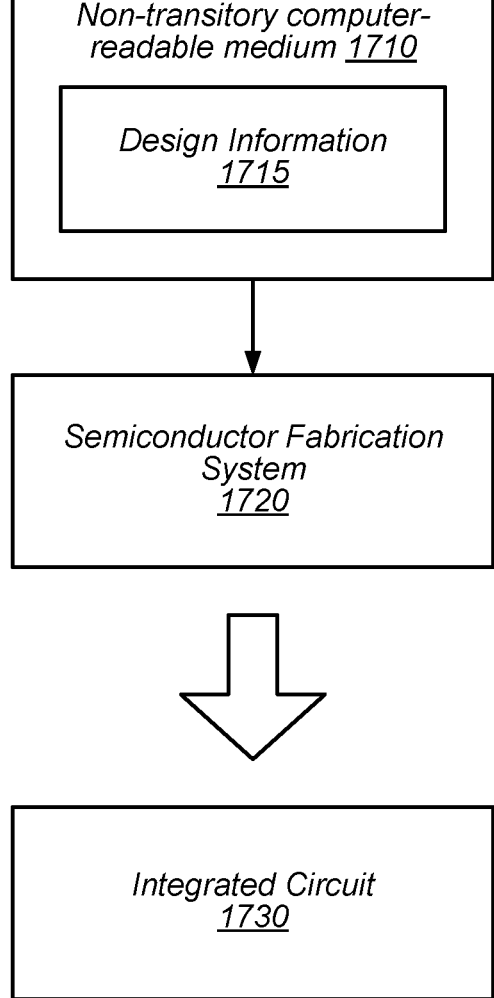
FIG. 17 illustrates an example of a non-transitory computer-readable storage medium that stores circuit design information.

FIG. 17 is a block diagram illustrating an example of a non-transitory computer-readable storage medium that stores circuit design information, according to some embodiments. In the illustrated embodiment, semiconductor fabrication system 1720 is configured to process the design information 1715 stored on non-transitory computer-readable storage medium 1710 and fabricate integrated circuit 1730 based on the design information 1715.

Non-transitory computer-readable storage medium 1710, may comprise any of various appropriate types of memory devices or storage devices. Non-transitory computer-readable storage medium 1710 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1710 may include other types of non-transitory memory as well or combinations thereof. Non-transitory computer-readable storage medium 1710 may include two or more memory mediums, which may reside in different locations, e.g., in different computer systems that are connected over a network.

Design information 1715 may be specified using any of various appropriate computer languages, including hardware description languages such as, without limitation: VHDL, Verilog, SystemC, SystemVerilog, RHDL, M, MyHDL, etc. Design information 1715 may be usable by semiconductor fabrication system 1720 to fabricate at least a portion of integrated circuit 1730. The format of design information 1715 may be recognized by at least one semiconductor fabrication system, such as semiconductor fabrication system 1720, for example. In some embodiments, design information 1715 may include a netlist that specifies elements of a cell library, as well as their connectivity. One or more cell libraries used during logic synthesis of circuits included in integrated circuit 1730 may also be included in design information 1715. Such cell libraries may include information indicative of device or transistor level netlists, mask design data, characterization data, and the like, of cells included in the cell library.

Integrated circuit 1730 may, in various embodiments, include one or more custom macrocells, such as memories, analog or mixed-signal circuits, and the like. In such cases, design information 1715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1720 may also be configured to perform various testing of fabricated circuits for correct operation.

In various embodiments, integrated circuit 1730 is configured to operate according to a circuit design specified by design information 1715, which may include performing any of the functionality described herein. For example, integrated circuit 1730 may include any of various elements shown or described herein. Further, integrated circuit 1730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:

an external phase circuit included on a first integrated circuit, wherein the external phase circuit is coupled to a regulated power supply node via a first inductor, wherein the external phase circuit is configured, in response to an activation of a first enable signal, to source a first current to the regulated power supply node using an external demand current;

a control circuit included on a second integrated circuit, wherein the control circuit is configured to:

generate the external demand current using a voltage of the regulated power supply node and a reference voltage; and generate the first enable signal using a sensed version of the first current.

2. The apparatus of claim 1, further comprising an internal phase circuit included on the second integrated circuit, wherein the internal phase circuit is coupled to the regulated power supply node via a second inductor, and wherein the internal phase circuit is configured, in response to an activation of a second enable signal, to source a second current to the regulated power supply node using an internal demand current.

3. The apparatus of claim 2, wherein the control circuit is further configured to:

generate the internal demand current using the voltage of the regulated power supply node and the reference voltage; and generate the second enable signal using a sensed version of the second current.

4. The apparatus of claim 3, wherein to generate the first enable signal, the control circuit is further configured to perform a first comparison of the sensed version of the first current to a first current threshold, and wherein to generate the second enable signal, the control circuit is further configured to perform a second comparison of the sensed version of the second current to a second current threshold.

5. The apparatus of claim 2, wherein a first switching frequency of the external phase circuit is less than a second switching frequency of the internal phase circuit.

6. The apparatus of claim 1, wherein to source the first current, the external phase circuit is further configured to perform a comparison of the external demand current and the sensed version of the first current.

7. A method, comprising:

sourcing, by an external phase circuit in response to an activation of a first enable signal and using an external demand current, a first current to a regulated power supply node via a first inductor, wherein the external phase circuit is included on a first integrated circuit;

generating, by a control circuit, the external demand current using a voltage of the regulated power supply node and a reference voltage, wherein the control circuit is included on a second integrated circuit; and generating, by the control circuit, the first enable signal using a sensed version of the first current.

8. The method of claim 7, further comprising sourcing, by an internal phase circuit in response to an activation of a second enable signal and using an internal demand current, a second current to the regulated power supply node via a second inductor, wherein the internal phase circuit is included on the second integrated circuit.

9. The method of claim 8, further comprising:

generating, by the control circuit, the internal demand current using the voltage of the regulated power supply node and the reference voltage; and generating, by the control circuit, the second enable signal using a sensed version of the second current.

10. The method of claim 9, wherein generating the first enable signal includes performing, by the control circuit, a first comparison of the sensed version of the first current to a first current threshold, and wherein generating the second enable signal including performing, by the control circuit, a second comparison of the sensed version of the second current to a second current threshold.

11. The method of claim 9, wherein sourcing the second current includes performing, by the internal phase circuit, a comparison of the internal demand current and the sensed version of the second current.

12. The method of claim 8, wherein a first switching frequency of the external phase circuit is less than a second switching frequency of the internal phase circuit.

13. The method of claim 7, wherein sourcing the first current includes performing, by the external phase circuit, a comparison of the external demand current and the sensed version of the first current.

14. An apparatus, comprising:

a first external phase circuit coupled to a first regulated power supply node via a first inductor, wherein the first external phase circuit is configured, based on a first plurality of control signals, to source a first current to the first regulated power supply node using a first input power supply node;

a second external phase circuit coupled to the first regulated power supply node via a second inductor, wherein the second external phase circuit is configured, based on a second plurality of control signals, to source a second current to the first regulated power supply node using a second input power supply node; and a first control circuit configured to generate the first plurality of control signals and the second plurality of control signals.

15. The apparatus of claim 14, further comprising:

a third external phase circuit coupled to a second regulated power supply node via a third inductor, wherein the third external phase circuit is configured, based on a third plurality of control signals, to source a third current to the second regulated power supply node using the first input power supply node; and a second control circuit configured to generate the third plurality of control signals.

16. The apparatus of claim 15, wherein the second control circuit includes an internal phase circuit coupled to the second regulated power supply node via a fourth inductor, and wherein the internal phase circuit is configured, in response to an activation of an enable signal, to source a fourth current to the second regulated power supply node using an internal demand current.

17. The apparatus of claim 16, wherein a first switching frequency of the third external phase circuit is less than a second switching frequency of the internal phase circuit.

18. The apparatus of claim 14, wherein a voltage level of the second input power supply node is greater than a voltage level of the first input power supply node.

19. The apparatus of claim 14, wherein the first controller circuit and second controller circuit are located on a first integrated circuit, and at least one of the first external phase circuit or second external phase circuit is located on a second integrated circuit.

20. The apparatus of claim 14, wherein the first external phase circuit is further configured to:

source the first current to the first regulated power supply node during a first on-time period; and source, via a third inductor, a third current to the first regulated power supply node during a second on-time period different than the first on-time period.

* * * * *